(12) United States Patent
Reitman et al.

(10) Patent No.: US 11,117,683 B2
(45) Date of Patent: Sep. 14, 2021

(54) SERVICE SATELLITE FOR PROVIDING IN-ORBIT SERVICES USING VARIABLE THRUSTER CONTROL

(71) Applicant: Astroscale Israel Ltd., Tel Aviv (IL)

(72) Inventors: Michael Reitman, Netanya (IL); Arnon Spitzer, Lapid (IL); Arie Halsband, Tel Aviv (IL); Ofir Azriel, Modiin (IL)

(73) Assignee: Astroscale Israel, Ltd., Tel Aviv (IL)

(*) Notice: Subject to any disclaimer, the term of this patent is extended or adjusted under 35 U.S.C. 154(b) by 0 days.

(21) Appl. No.: 17/104,343

(22) Filed: Nov. 25, 2020

(65) Prior Publication Data
US 2021/0078732 A1 Mar. 18, 2021

Related U.S. Application Data

(63) Continuation of application No. 16/815,349, filed on Mar. 11, 2020, which is a continuation of application
(Continued)

(51) Int. Cl.
*B64G 1/10* (2006.01)
*B64G 1/40* (2006.01)
(Continued)

(52) U.S. Cl.
CPC .......... *B64G 1/1078* (2013.01); *B64G 1/242* (2013.01); *B64G 1/26* (2013.01); *B64G 1/40* (2013.01); *B64G 1/646* (2013.01); *B64G 4/00* (2013.01)

(58) Field of Classification Search
CPC .......... B64G 1/078; B64G 1/242; B64G 1/26; B64G 1/40; B64G 1/646; B64G 4/00
(Continued)

(56) References Cited

U.S. PATENT DOCUMENTS 3,910,533 A 10/1975 Cheatham et al.
3,948,470 A 4/1976 Perkins
(Continued)

FOREIGN PATENT DOCUMENTS

DE 3244211 A1 5/1984
EP 0369065 5/1990
(Continued)

OTHER PUBLICATIONS

Bergmann et al., "Mass Property Estimation for Control of Asymmetrical Satellites," J. Guidance, vol. 10, No. 5, Sep.-Oct. 1987 (pp. 483-491).
(Continued)

*Primary Examiner* — Brady W Frazier
(74) *Attorney, Agent, or Firm* — Critical Path IP Law, LLC

(57) ABSTRACT

A service satellite for providing station keeping services to a host satellite is disclosed. The service satellite may have a body, and a gripping mechanism attached to the body. The gripping mechanism may be adapted to attach to an interface ring extending from an external surface of the host satellite to form an interconnection between the host satellite and the service satellite through the externally extending interface ring. Attaching the gripping mechanism to the interface ring may form an interconnected unit having a combined center of mass. The service satellite may have at least two thrusters and at least one controller. The at least one controller may maintain the interconnected unit in a substantially stationary orbit by selectively orienting the two thrusters such that the thrust vectors from the two thrusters avoid passing through the combined center of mass, and are each offset from the combined center of mass.

20 Claims, 13 Drawing Sheets

Related U.S. Application Data

No. 15/450,601, filed on Mar. 6, 2017, now Pat. No. 10,625,882.

(51) Int. Cl.
  *B64G 1/64* (2006.01)
  *B64G 1/24* (2006.01)
  *B64G 1/26* (2006.01)
  *B64G 4/00* (2006.01)

(58) Field of Classification Search
  USPC .......................................................... 244/164
  See application file for complete search history.

(56) References Cited

U.S. PATENT DOCUMENTS

| | | | |
|---|---|---|---|
| 4,018,409 | A | 4/1977 | Burch et al. |
| 4,173,324 | A | 11/1979 | Rudmann |
| 4,177,964 | A | 12/1979 | Hujsak et al. |
| 4,195,804 | A | 4/1980 | Hujsak et al. |
| 4,219,171 | A | 8/1980 | Rudmann |
| 4,260,187 | A | 4/1981 | Bejczy |
| 4,295,740 | A | 10/1981 | Sturges, Jr. |
| 4,298,178 | A | 11/1981 | Hujsak |
| 4,381,092 | A | 4/1983 | Barker |
| 4,500,057 | A | 2/1985 | Duwelz |
| 4,588,150 | A | 5/1986 | Bock et al. |
| 4,607,815 | A | 8/1986 | Turci et al. |
| 4,635,885 | A | 1/1987 | Hujsak |
| 4,730,798 | A | 3/1988 | Wertz |
| 4,834,531 | A | 5/1989 | Ward |
| 4,881,809 | A | 11/1989 | Thierry |
| 4,890,918 | A | 1/1990 | Monford |
| 5,046,691 | A | 9/1991 | Hart |
| 5,109,345 | A | 4/1992 | Dabney et al. |
| 5,120,243 | A | 6/1992 | Mee |
| 5,253,944 | A | 10/1993 | Preston |
| 5,294,079 | A | 3/1994 | Draznin et al. |
| 5,299,764 | A | 4/1994 | Scott |
| 5,302,816 | A | 4/1994 | Tulet |
| 5,334,848 | A | 8/1994 | Grimm |
| 5,340,060 | A | 8/1994 | Shindo |
| 5,349,532 | A | 9/1994 | Tilley et al. |
| 5,364,046 | A | 11/1994 | Dobbs et al. |
| 5,411,227 | A | 5/1995 | Basuthakur et al. |
| 5,436,841 | A | 7/1995 | Ferro |
| 5,443,231 | A | 8/1995 | Anzel |
| 5,466,025 | A | 11/1995 | Mee |
| 5,490,075 | A | 2/1996 | Howard et al. |
| 5,511,748 | A * | 4/1996 | Scott .................... B64G 1/1078 244/172.5 |
| 5,617,335 | A | 4/1997 | Hashima et al. |
| 5,734,736 | A | 3/1998 | Palmer et al. |
| 5,735,488 | A | 4/1998 | Schneider |
| 5,765,780 | A | 6/1998 | Barskey et al. |
| 5,803,407 | A | 9/1998 | Scott |
| 5,806,802 | A | 9/1998 | Scott |
| 5,850,993 | A | 12/1998 | Hubert |
| 6,017,000 | A | 1/2000 | Scott |
| 6,032,904 | A | 3/2000 | Hosick et al. |
| 6,053,455 | A | 4/2000 | Price et al. |
| 6,091,345 | A | 7/2000 | Howard et al. |
| 6,102,337 | A | 8/2000 | Quartararo |
| 6,213,432 | B1 | 4/2001 | Koppel |
| 6,227,495 | B1 | 5/2001 | Howard et al. |
| 6,254,035 | B1 | 7/2001 | Howard et al. |
| 6,260,805 | B1 | 7/2001 | Yocum, Jr. et al. |
| 6,296,207 | B1 | 10/2001 | Tilley et al. |
| 6,299,107 | B1 | 10/2001 | Kong et al. |
| 6,330,987 | B1 | 12/2001 | Scott |
| 6,360,995 | B1 | 3/2002 | Nygren, Jr. |
| 6,445,981 | B1 | 9/2002 | Higham et al. |
| 6,481,672 | B1 | 11/2002 | Goodzeit et al. |
| 6,484,973 | B1 | 11/2002 | Scott |
| 6,523,784 | B2 | 2/2003 | Steinsiek et al. |
| 6,595,469 | B2 | 7/2003 | Li et al. |
| 6,634,603 | B2 | 10/2003 | Cooper |
| 6,637,701 | B1 | 10/2003 | Glogowski et al. |
| 6,658,329 | B1 | 12/2003 | Howard et al. |
| 6,669,148 | B2 | 12/2003 | Anderman et al. |
| 6,677,941 | B2 | 1/2004 | Lin |
| 6,742,745 | B2 | 6/2004 | Tchoryk et al. |
| 6,840,481 | B1 | 1/2005 | Gurevich |
| 6,843,446 | B2 | 1/2005 | Scott |
| 6,866,232 | B1 | 3/2005 | Finney |
| 6,896,441 | B1 | 5/2005 | Champagne et al. |
| 6,910,660 | B2 | 6/2005 | LeCroy, Jr. |
| 6,945,500 | B2 | 9/2005 | Wingo |
| 6,969,030 | B1 | 11/2005 | Jones et al. |
| 7,070,151 | B2 | 7/2006 | D'Ausilio et al. |
| 7,104,505 | B2 | 9/2006 | Tchoryk et al. |
| 7,114,682 | B1 | 10/2006 | Kistler et al. |
| 7,133,815 | B2 | 11/2006 | Zentgraf |
| 7,142,981 | B2 | 11/2006 | Hablani |
| 7,195,206 | B2 | 3/2007 | Kerstein |
| 7,207,525 | B2 | 4/2007 | Bischof et al. |
| 7,216,833 | B2 | 5/2007 | D'Ausilio et al. |
| 7,216,834 | B2 | 5/2007 | D'Ausilio et al. |
| 7,240,879 | B1 | 7/2007 | Cepollina et al. |
| 7,293,743 | B2 | 11/2007 | Cepollina et al. |
| 7,365,832 | B2 | 4/2008 | Kase |
| 7,370,834 | B2 | 5/2008 | Scott |
| 7,387,279 | B2 | 6/2008 | Anderman et al. |
| 7,438,264 | B2 | 10/2008 | Cepollina et al. |
| 7,461,818 | B2 | 12/2008 | D'Ausilio et al. |
| 7,484,690 | B2 | 2/2009 | D'Ausilio et al. |
| 7,513,459 | B2 | 4/2009 | Cepollina et al. |
| 7,513,460 | B2 | 4/2009 | Cepollina et al. |
| 7,515,257 | B1 | 4/2009 | Roe et al. |
| 7,535,706 | B2 | 5/2009 | Herberholt et al. |
| 7,575,199 | B2 | 8/2009 | D'Ausilio et al. |
| 7,575,200 | B2 | 8/2009 | Behrens et al. |
| 7,588,213 | B2 | 9/2009 | D'Ausilio et al. |
| 7,607,616 | B2 | 10/2009 | Lundgren |
| 7,611,096 | B2 | 11/2009 | D'Ausilio et al. |
| 7,611,097 | B2 | 11/2009 | D'Ausilio et al. |
| 7,624,950 | B2 | 12/2009 | D'Ausilio et al. |
| 7,669,804 | B2 | 3/2010 | Strack et al. |
| 7,823,837 | B2 | 11/2010 | Behrens et al. |
| 7,828,249 | B2 | 11/2010 | Ritter et al. |
| 7,850,388 | B2 | 12/2010 | Khoshnevis |
| 7,857,261 | B2 | 12/2010 | Tchoryk, Jr. et al. |
| 7,861,974 | B2 | 1/2011 | Hays et al. |
| 7,861,975 | B2 | 1/2011 | Behrens et al. |
| 7,961,301 | B2 | 6/2011 | Earhart et al. |
| 7,992,824 | B2 | 8/2011 | Tchoryk, Jr. et al. |
| 8,006,937 | B1 | 8/2011 | Romano et al. |
| 8,006,938 | B2 | 8/2011 | Behrens et al. |
| 8,016,242 | B2 | 9/2011 | Baumann |
| 8,019,493 | B1 | 9/2011 | Weigl et al. |
| 8,033,508 | B2 | 10/2011 | Baumann et al. |
| 8,056,864 | B2 | 11/2011 | Hays et al. |
| 8,074,935 | B2 | 12/2011 | Gryniewski et al. |
| 8,091,835 | B2 | 1/2012 | Behrens et al. |
| 8,132,761 | B2 | 3/2012 | Gruber et al. |
| 8,181,911 | B1 | 5/2012 | Gryniewski et al. |
| 8,196,870 | B2 | 6/2012 | Gryniewski et al. |
| 8,205,838 | B2 | 6/2012 | Moorer, Jr. et al. |
| 8,210,480 | B2 | 7/2012 | Moorer et al. |
| 8,240,613 | B2 | 8/2012 | Ritter et al. |
| 8,245,370 | B2 | 8/2012 | Ritter et al. |
| 8,282,043 | B2 | 10/2012 | Ho |
| 8,306,273 | B1 | 11/2012 | Gryniewski et al. |
| 8,326,523 | B2 | 12/2012 | Stimac et al. |
| 8,333,347 | B2 | 12/2012 | Ritter et al. |
| 8,352,100 | B2 | 1/2013 | Stimac et al. |
| 8,386,096 | B2 | 2/2013 | Stimac et al. |
| 8,412,391 | B2 | 4/2013 | Paluszek et al. |
| 8,439,312 | B2 | 5/2013 | Ho et al. |
| 8,448,904 | B2 | 5/2013 | Gryniewski et al. |
| 8,464,983 | B2 | 6/2013 | Knirsch |
| 8,820,353 | B2 | 9/2014 | Yandle et al. |
| 8,899,527 | B2 | 12/2014 | Allen et al. |
| 8,976,340 | B2 | 3/2015 | Gilliland et al. |

(56) References Cited

U.S. PATENT DOCUMENTS

| | | |
|---|---|---|
| 9,001,313 B2 | 4/2015 | Kameyama et al. |
| 9,041,915 B2 | 5/2015 | Earhart et al. |
| 9,108,747 B2 | 8/2015 | Roberts et al. |
| 9,231,323 B1 | 1/2016 | Jaeger |
| 9,260,206 B2 | 2/2016 | Allen et al. |
| 9,284,069 B2 | 3/2016 | Bigelow |
| 9,284,072 B2 | 3/2016 | Horie |
| 9,284,073 B2 | 3/2016 | Bigelow |
| 9,302,793 B2 | 4/2016 | Ghofranian et al. |
| 9,399,295 B2 | 7/2016 | Roberts et al. |
| 9,522,746 B1 | 12/2016 | Ih et al. |
| 2002/0179775 A1 | 12/2002 | Turner |
| 2003/0029969 A1 | 2/2003 | Turner |
| 2003/0183726 A1 | 10/2003 | Lounge et al. |
| 2004/0026571 A1* | 2/2004 | Scott ............... B64G 1/24 244/172.5 |
| 2004/0031885 A1 | 2/2004 | D'Ausilio et al. |
| 2004/0164205 A1 | 8/2004 | Kellberg |
| 2004/0245405 A1 | 12/2004 | Tchoryk et al. |
| 2005/0001102 A1* | 1/2005 | Schubert ............ B64G 1/242 244/164 |
| 2005/0040282 A1 | 2/2005 | Wingo |
| 2005/0263649 A1 | 12/2005 | Ritter et al. |
| 2006/0145024 A1 | 7/2006 | Kosmas |
| 2007/0129879 A1 | 6/2007 | Fedora |
| 2007/0228219 A1* | 10/2007 | Behrens ............ B64G 1/646 244/172.5 |
| 2007/0228220 A1 | 10/2007 | Behrens et al. |
| 2008/0011903 A1 | 1/2008 | D'Ausilio et al. |
| 2008/0029651 A1 | 2/2008 | D'Ausilio et al. |
| 2008/0078886 A1 | 4/2008 | Foster et al. |
| 2009/0164055 A1 | 6/2009 | Kosmas |
| 2009/0166476 A1* | 7/2009 | Termini ............ B64G 1/26 244/158.6 |
| 2010/0038491 A1 | 2/2010 | Cepollina et al. |
| 2011/0180670 A1 | 7/2011 | D'Ausilio et al. |
| 2012/0097797 A1 | 4/2012 | Woo et al. |
| 2013/0126678 A1 | 5/2013 | Romney, Jr. |
| 2013/0249229 A1* | 9/2013 | Roberts ............ B25J 15/0226 294/198 |
| 2013/0292516 A1 | 11/2013 | Celerier |
| 2014/0032022 A1* | 1/2014 | Caullier ............ B64G 1/26 701/13 |
| 2014/0061386 A1* | 3/2014 | Peterka, III ........ B64G 1/641 244/171.5 |
| 2014/0158830 A1 | 6/2014 | Rossettini et al. |
| 2014/0361123 A1 | 12/2014 | Celerier |
| 2015/0000250 A1 | 1/2015 | Vial et al. |
| 2015/0001345 A1 | 1/2015 | Polle |
| 2015/0008290 A1 | 1/2015 | Bigelow |
| 2015/0053823 A1 | 2/2015 | Bigelow |
| 2015/0115107 A1 | 4/2015 | Andoh |
| 2015/0166202 A1* | 6/2015 | Maediger ........... B25J 15/0057 244/171.1 |
| 2015/0307214 A1 | 10/2015 | Amalric |
| 2015/0314893 A1* | 11/2015 | Rembala ........... B64G 1/1078 244/172.5 |
| 2015/0346344 A1 | 12/2015 | Gilliland et al. |
| 2016/0039543 A1 | 2/2016 | Roberts et al. |
| 2016/0039544 A1 | 2/2016 | Roberts et al. |
| 2016/0046395 A1 | 2/2016 | Mansour et al. |
| 2016/0114908 A1 | 4/2016 | Knirsch et al. |
| 2016/0130020 A1* | 5/2016 | Chambert .......... B64G 4/00 244/172.4 |
| 2016/0176545 A1* | 6/2016 | Munir ............... B64G 1/26 244/158.6 |
| 2016/0194095 A1 | 7/2016 | Weiss et al. |
| 2016/0207640 A1 | 7/2016 | Kaltenbach |
| 2016/0288928 A1* | 10/2016 | Smith ............... F28D 15/04 |
| 2017/0029138 A1 | 2/2017 | Bultel |
| 2017/0081048 A1 | 3/2017 | Glogowski et al. |
| 2017/0225805 A1 | 8/2017 | Wang et al. |
| 2017/0283094 A1* | 10/2017 | Ho ................. B64G 1/26 |
| 2017/0349302 A1* | 12/2017 | Bibighaus .......... B64G 1/26 |
| 2018/0029727 A1* | 2/2018 | Doubrere ........... B64G 1/40 |
| 2018/0148197 A1* | 5/2018 | Halsband ........... B64G 1/222 |
| 2018/0155064 A1 | 6/2018 | Haertel et al. |
| 2018/0186476 A1 | 7/2018 | Poncet et al. |
| 2019/0300207 A1* | 10/2019 | Izumisawa .......... B64G 1/26 |

FOREIGN PATENT DOCUMENTS

| | | |
|---|---|---|
| EP | 2530018 | 12/2012 |
| EP | 2660154 A2 | 11/2013 |
| JP | H01-282098 | 11/1989 |
| JP | H03-118299 | 5/1991 |
| WO | WO 97/31822 | 9/1997 |
| WO | WO 2005/073085 | 8/2005 |
| WO | WO 2005/110847 | 11/2005 |
| WO | WO 2005/118394 | 12/2005 |
| WO | WO 2008/066512 | 6/2008 |
| WO | WO 2011/110701 | 9/2011 |
| WO | WO 2014/006478 | 1/2014 |
| WO | WO 2014/024199 A1 | 2/2014 |
| WO | WO 2015158932 | 10/2015 |
| WO | WO 2016/020390 | 2/2016 |
| WO | WO 2016/030890 A1 | 3/2016 |

OTHER PUBLICATIONS

Collins et al., "Small Orbit Transfer Vehicle (OTV) for On-Orbit Satellite Servicing and Resupply," 15th Annual/USU Conference on Small Satellites, Aug. 2001 (pp. 1-17).

Dabney, "Automatic Rendezvous and Docking: A Parametric Study," NASA Technical Paper 2314, May, 1984 (35 pages).

English-language International Search Report from the Israel Patent Office for International Application No. PCT/IL2015/050856, dated Dec. 14, 2015.

European Search Report dated Apr. 18, 2018, in Application No. 15835340.0-1010 / 3186151—PCT/IL2015/050856 (10 pages).

European Search Report dated Jul. 26, 2018 in European Application No. 18160022.2 (9 pages).

Fehse, "Autonomous Rendezvous and Docking of Spacecraft," Chapter 1, Cambridge University Press, 2003, pp. 1-7 (15 pages total).

Hirzinger, Gerd, "West Germany's First Space Robot," Aerospace America, American Institute of Aeronautics & Astronautics, New York, vol. 27, No. 8, Aug. 1, 1989 (pp. 42-46).

Inaba et al., "Rescuing a Stranded Satellite in Space—Experimental Robotic Capture of Non-Cooperative Satellites," Trans. Japan Soc. Aero. Space Sol., vol. 48, No. 162, pp. 213-220, 2006.

Machida, Kazuo et al., "Maneuvering and Manipulation of Flying Space Telerobotics System," Proceedings of the 1992 IEEE/RSJ International Conference on Intelligent Robots and Systems, Raleigh, NC (Jul. 7-10, 1992) (pp. 3-10).

Maediger et al., "Robotics Servicing Tool for Large Satellites," Airbus Defence and Space, Bremen, Germany, 2014, available at http://robotics.estec.esa.int/i-SAIRAS/isairas2014/Data/Session%205b/ISAIRAS_FinalPaper_0028.pdf (8 pages).

Masek et al., "Technical Memorandum 33-510," National Aeronautics and Space Administration, Nov. 15, 1971 (28 pages).

Meissinger et al., "Mission Design and System Requirements for a Multiple-Function Orbital Transfer Vehicle," American Institute of Aeronautics and Astronautics, Sep. 1999 (11 pages).

Mugnuolo, R., et al., "The SPIDER manipulation system (SMS); The Italian approach to space automation," Robotics and Autonomous Systems, (Mar. 1, 1998) (pp. 79-88).

LeRoy et al, "Spacecraft Attitude Control for a Solar Electric Geosynchronous Transfer Mission," NASA Technical Memorandum, Mar. 19, 1975 (15 pages).

Wertz et al., "Autonomous Rendezvous and Docking Technologies—Status and Prospects," SPIE AeroSense Symposium, Paper No. 5088-3, Apr. 21, 2003 (11 pages).

Written Opinion of the International Searching Authority from the Israel Patent Office for International Application No. PCT/IL2015/050856, dated Dec. 14, 2015.

Yoshida, Kazuya et al., "Dual Arm Coordination in Space Free-Flying Robot," Proceedings of the 1991 IEEE, International Con-

(56) References Cited

OTHER PUBLICATIONS ference on Robotics and Automation, Sacramento, California, Apr. 9-11, 1991 (pp. 2516-2520).

* cited by examiner

SERVICE SATELLITE FOR PROVIDING IN-ORBIT SERVICES USING VARIABLE THRUSTER CONTROL

CROSS REFERENCE TO RELATED APPLICATIONS

This application is a continuation of U.S. patent application Ser. No. 16/815,349, filed Mar. 11, 2020 and titled "Service Satellite for Providing In-Orbit Services Using Variable Thruster Control," which is a continuation of U.S. patent application Ser. No. 15/450,601, filed Mar. 6, 2017 and titled "Service Satellite for Providing In-Orbit Services Using Variable Thruster Control," the disclosures of which are hereby incorporated herein by reference in their entireties.

BACKGROUND

The commercial and governmental space sector faces high costs in placing and maintaining communication and other satellites in orbit around the earth. A satellite's life is typically governed by the amount of on-board propellant carried by the satellite. Even when onboard electronics are still functional, once the fuel runs out, a satellite typically loses its usefulness. As demand for satellite connectivity has increased over time, so has typical satellite size. A substantial initial investment is required to launch a large geostationary communication satellite. The initial investment for a satellite service provider includes not only the cost of the satellite itself, but also the cost of the launch vehicle required to inject the satellite from earth into an injection orbit.

A satellite typically includes its own propulsion system, which allows the satellite to transition itself from an injection orbit to a final geosynchronous orbit and to maintain its orbital position for up to 15 years. Propulsion system technology has also matured throughout the years and allows the satellite to make use of not only chemical systems but also electrical propulsion systems that have a much higher efficiency. This increased efficiency saves fuel, which in turn allows placement of larger and/or heavier satellites in orbit.

A satellite in a geostationary orbit around the earth experiences gravitational and solar forces, which tend to move the satellite away from its desired geostationary position. The satellite relies on its propulsion system to take corrective measures to compensate for the displacements caused by the gravitational or solar forces. The propulsion maneuvers required to maintain the geostationary position of the satellite are sometimes referred to as station keeping. When a satellite depletes is entire on-board fuel, it can no longer use its propulsion system to maintain its geostationary position and may have to be replaced.

In some cases, the satellite launch vehicle may underperform, injecting the satellite into an incorrect orbit. The satellite may then have to expend its on-board fuel to transition itself from the incorrect orbit to its correct orbit. Thus, some of the fuel intended for station keeping may have to be used for initial orbit correction, which in turn may result in a shorter operational life of the satellite, providing less revenue to the satellite service provider. In other cases, a satellite may be required to change its orbital position and/or orientation for various commercial or operational reasons. These changes may also require the satellite to expend its on-board fuel, resulting in a shorter operational life.

Because of the high cost associated with replacing a satellite in space, there is a need for technology that may help to extend the life of a satellite already in orbit.

SUMMARY

In one aspect, the present disclosure is directed to a service satellite for providing station keeping services to a host satellite. The service satellite may include a body and a gripping mechanism attached to the body. The gripping mechanism may be adapted to attach to an interface ring extending from an external surface of the host satellite. Attaching the gripping mechanism to the interface ring may form an interconnection between the host satellite and the service satellite through the externally extending interface ring, resulting in an interconnected unit having a combined center of mass. The service satellite may include at least two thrusters and at least one controller. Such a controller may be configured to maintain the interconnected unit in a substantially stationary orbit, and may do so by selectively moving each of the at least two thrusters to angular orientations such that during thruster firing, thrust vectors from each of the at least two thrusters avoid passing through the combined center of mass, and are each offset from the combined center of mass.

In another aspect, a station keeping method may include launching a service satellite into space and maneuvering it within docking distance of the host satellite. The method may also include connecting the service satellite to the host satellite to form an interconnected unit by engaging at least two arms of the service satellite with an external interface ring of the host satellite. The interconnected unit may have a combined center of mass. The method may include selectively moving each of at least two thrusters of the service satellite for firing during station keeping maneuvers, such that thrust vectors from the at least two thrusters avoid passing through the combined center of mass and are offset from the combined center of mass.

Additional objects and advantages of the embodiments of the present disclosure will be set forth in part in the description which follows, and in part will be understood from the description, or may be learned by practice of the embodiments of the present disclosure. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this disclosure, illustrate exemplary disclosed embodiments of the present disclosure and, together with the description, serve to explain the principles of the present disclosure. In the drawings.

DETAILED DESCRIPTION

Aspects of the present disclosure relate to a service satellite for providing station keeping services to a host satellite. The term "satellite" refers generally to a spacecraft that can be launched into space and is capable of orbiting a planetary body. By way of example, a satellite may be capable of orbiting around the earth. The term "host satellite" refers generally to a spacecraft that is already in space in an orbit around a planetary body. In some exemplary embodiments, the host satellite may be located in a geostationary orbit around the earth. The term "service satellite" refers to a satellite or spacecraft capable of providing services to a host satellite, while both the host satellite and the service satellite are in orbit around a planetary body. By way of example, such in-orbit services provided by a service satellite to a host satellite may include orbit raising, station keeping, station change, inclination change, deorbiting, orbital repositioning, refueling or any other maneuver or activity to repair, move, or extend the life of a host satellite.

Figures 1A, 1B:
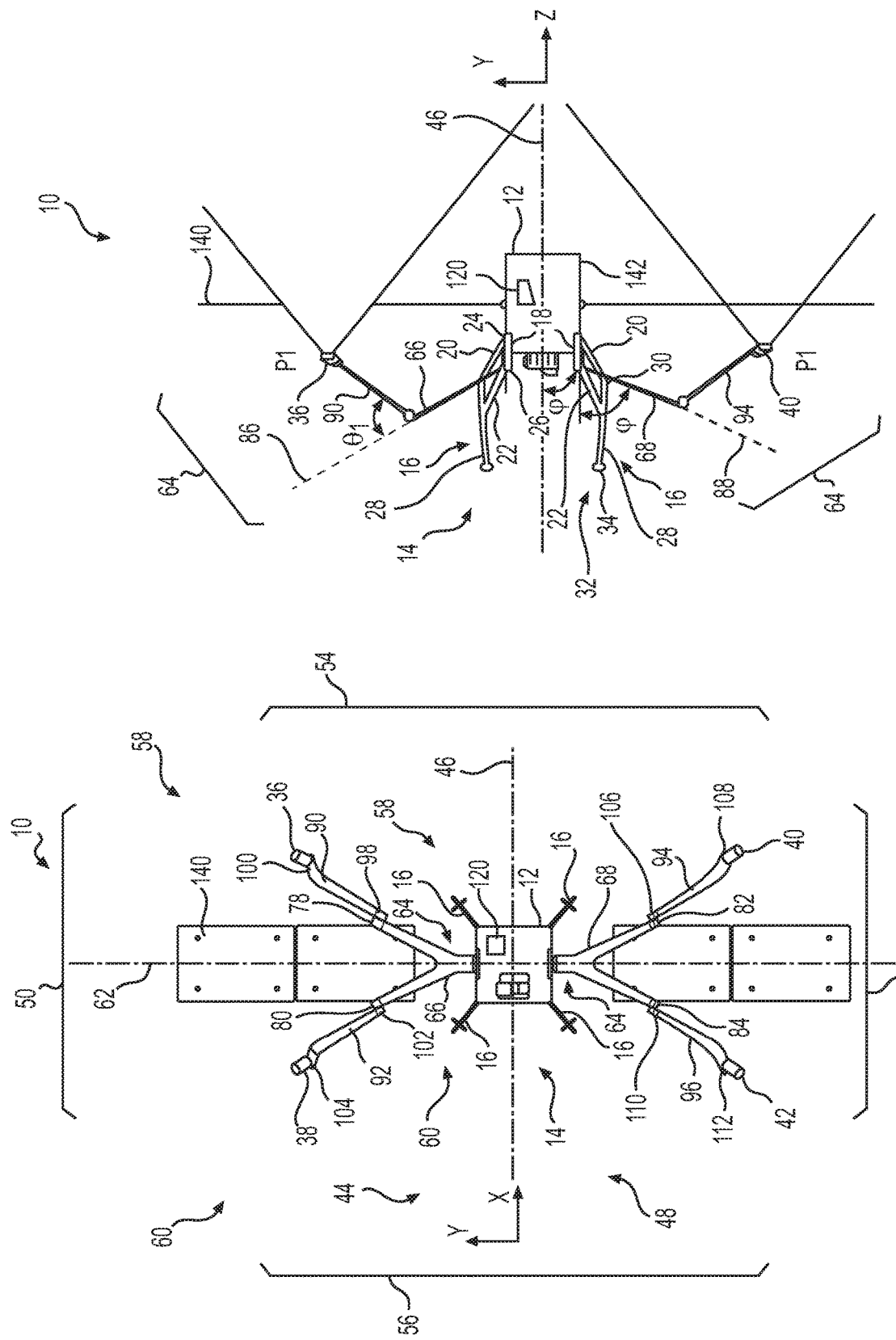
FIG. 1A illustrates a top view of an exemplary service satellite consistent with disclosed embodiments.
FIG. 1B illustrates a side view of the exemplary service satellite of FIG. 1A, consistent with disclosed embodiments.

While the present disclosure provides exemplary configurations of a service satellite, it should be noted that aspects of the disclosure in their broadest sense are not limited to the disclosed configurations. Rather, it is contemplated that the foregoing principles may be applied to other configurations of service satellites. FIG. 1A illustrates a front view of an exemplary embodiment of a service satellite 10 according to the present disclosure. FIG. 1B illustrates a side view of the exemplary disclosed service satellite 10.

In accordance with the present disclosure, a service satellite may provide station keeping services to the host satellite. As discussed above, the host satellite may experience gravitational forces and/or solar forces, which may cause the host satellite to be displaced from its allocated position in a geostationary orbit. The service satellite may help to compensate for such displacements by maintaining the host satellite in its allocated position in the geostationary orbit. The term station keeping may generally refer to maneuvers associated with providing the compensatory displacements required to maintain the host satellite in its allocated position in the geostationary orbit.

Figure 3:
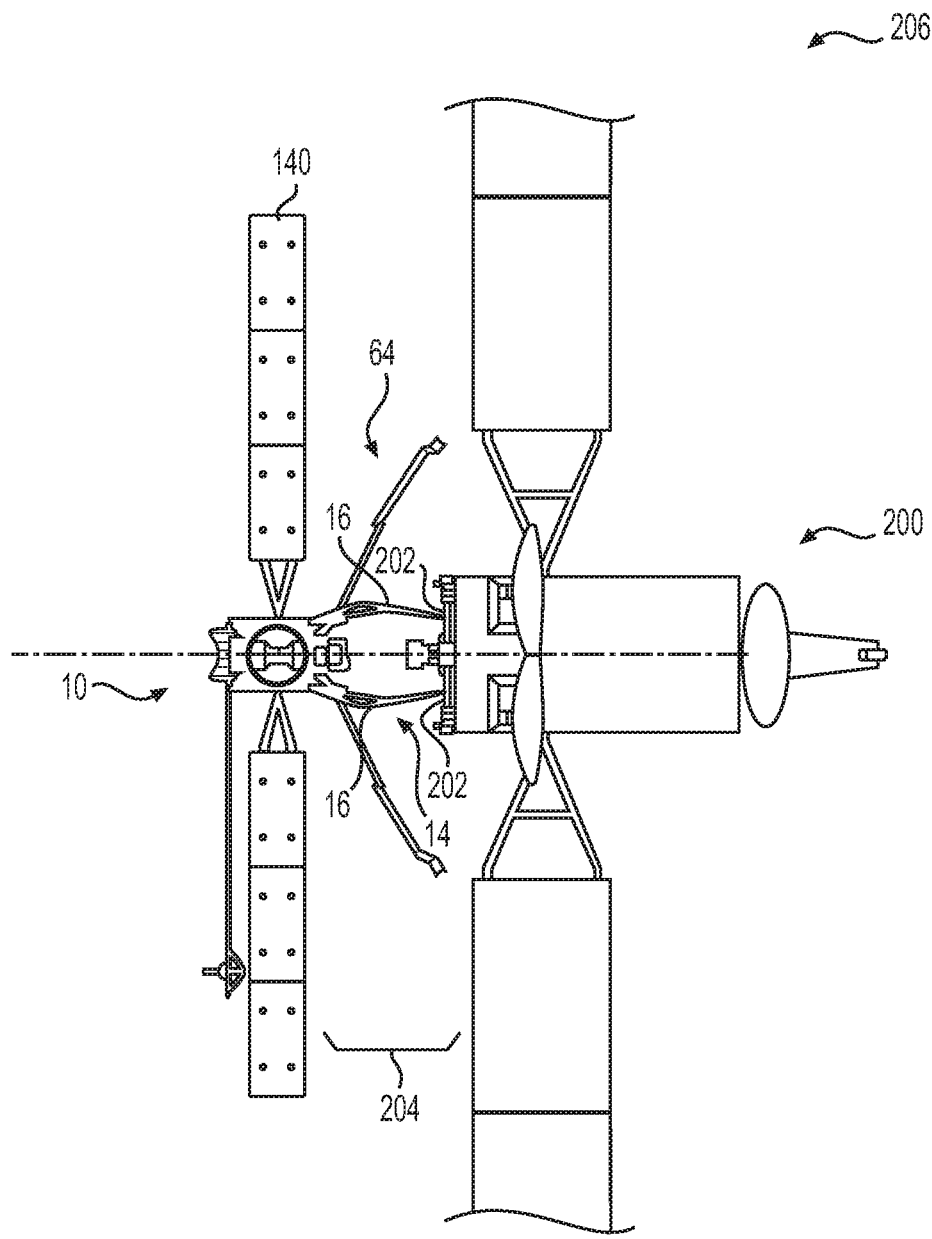
FIG. 3 illustrates an exemplary interconnected unit or tandem assembly of the service satellite of FIGS. 1A and 1B with a host satellite, consistent with disclosed embodiments.

In some exemplary embodiments, the host satellite may have an interface ring extending from an external surface of the host satellite. The term "interface ring" refers generally to a structure attached to the external surface of the host satellite. An interface ring may be used to attach the host satellite to a launch vehicle or rocket for launching the host satellite into space. Alternatively, the interface ring may also be referred to as a payload attach ring, indicating that it may be used to attach the host satellite as a payload to a launch vehicle. The interface ring may be attached to an outer (or external) surface of the host satellite. In some exemplary embodiments, the interface ring may have a generally circular shape. However, it is contemplated that the interface ring may have any shape, for example, elliptical, polygonal, square, rectangular, or any other shape known in the art. By way of example, as illustrated in FIG. 3, a host satellite 200 may have an interface ring 202.

A service satellite in accordance with the present disclosure may include a body. The term "body" may refer generally to an enclosure or housing that encompasses one or more components of the service satellite. For example, the body may encompass and enclose electronic circuitry for controlling various components of the service satellite, communications circuitry, fuel tanks that may hold fuel required to propel the service satellite, reaction wheels for storing the residual angular momentums of the service satellite, a variety of sensors, including sensors for determining accelerations and torques on the service satellite, and any other satellite components known in the art. In some exemplary embodiments, the body of the service satellite may form a substantially complete enclosure. In other exemplary embodiments, one or more side walls of the body may have openings. The body of the service satellite may have any shape. For example, the body of the service satellite may be cubical, cuboidal, cylindrical, polygonal, or may have any other shape known in the art. FIGS. 1A and 1B, for example, illustrate a generally cuboidal body 12 of service satellite 10.

The service satellite in accordance with the present disclosure may also include a gripping mechanism attached to the body. The gripping mechanism may be adapted to attach to an interface ring extending from an external surface of the host satellite. The term "gripping mechanism" refers generally to one or more structural elements associated with the service satellite, which are capable of being mechanically attached or connected to the host satellite. In accordance with this disclosure, the gripping mechanism may be accomplished by various alternative structures. For example, the gripping mechanism may include one or more arms attached at one end to the body of the service satellite. The free end of the arm may include a clamping device configured to receive a portion of the host satellite between opposing clamping elements. In one exemplary embodiment according to the present disclosure, the interface ring of the host satellite may be received between the opposing clamping elements of the clamping device. The opposing clamping elements may be configured to sandwich the interface ring between the opposing clamping elements.

In another exemplary embodiment of a gripping mechanism, the free end of the arm may include radially expanding structural elements which may engage with an inner surface of the interface ring at one or more locations. A radially outward force exerted by the radially expanding members on the interface ring may serve to attach the arm to the interface ring. While the present disclosure describes various examples of the gripping mechanism, the disclosure in its broadest sense is not limited to a particular gripping mechanism configuration or construction. Rather, it is contemplated that any structure or configuration capable of forming a secure connection with the host satellite is considered a "gripping mechanism" within the meaning of this disclosure. FIGS. 1A and 1B illustrate an exemplary embodiment of a gripping mechanism 14.

Thus, a gripping mechanism, in accordance with this disclosure, may include at least two arms, which, for example, may be configured to engage with the interface ring. The term "arm," which may be also referred to as "docking arm," may include one or more structural members extending outward from a body of the service satellite. Each arm may have one or more articulation points or elbows. It is contemplated that in some exemplary embodiments, the service satellite may include more than two arms. FIG. 1A illustrates an exemplary embodiment of service satellite 10, which may include four docking arms 16. As illustrated in FIG. 1B, each docking arm 16 may include a four-bar linkage mechanism. It is to be noted, however, that the docking arm according to the present disclosure is not limited to the disclosed four-bar linkage configuration. Rather, it is contemplated that docking arm 16 may include a two-bar, a three-bar, or a six-bar linkage mechanism. In some exemplary embodiments according to the present disclosure, docking arm 16 may include any number of linkages. It is also contemplated that in some embodiments, no linkages will be employed.

In the exemplary embodiment of service satellite 10 illustrated in FIG. 1B, docking arm 16 may include a stationary crank 18 attached to body 12 of service satellite 10. As also illustrated in FIG. 1B, docking arm 16 may include two cranks 20, 22 spaced apart from each other, and pivotably connected to stationary crank 18 at hinges 24 and 26, respectively. Rotation of each of cranks 20 and 22 about hinges 24 and 26, respectively, may be independently controlled to move docking arm 16. It is also contemplated that in some exemplary embodiments, a portion of body 12 of service satellite 10 may replace stationary crank 18 of the four-bar linkage mechanism. Thus, for example, cranks 20, 22 may be spaced apart from each other, and may be pivotably connected to body 12 of service satellite 10 via hinges 24, 26, respectively.

In the exemplary embodiment of docking arm 16 illustrated in FIG. 1B, an operational arm 28 may be pivotably connected at one end 30 to one of the two cranks (e.g. crank 20), while the other of the two cranks (e.g. crank 22) may be connected to operational arm 28 between the connected end 30 and a free end 32. Free end 32 of operational arm 28 may include a ring-engaging portion 34 configured to engage with the interface ring of the host satellite. The ring-engaging portion 34 may include one or more of the clamping mechanisms discussed above. Although the present disclosure describes a service satellite 10 having four docking arms 16, it is contemplated that service satellite 10 may include any number of docking arms 16.

Additionally, although the present disclosure describes attachment of the docking arm to the interface ring of the host satellite, the disclosure in its broadest sense is not limited to a particular method of attachment. It is contemplated that the free end of the gripping mechanism may be configured to be attached to an external structural feature of the host satellite other than the interface ring. For example, the free end of the gripping mechanism may be configured to be attached to a projection or other structural feature disposed on an external surface of the host satellite.

In accordance with the present disclosure, by attaching to the interface ring, the gripping mechanism may form an interconnection between the host satellite and the service satellite through the externally extending interface ring. The term "interconnection" refers generally to an attachment, connection, or coupling between two objects. The interconnection between the service satellite and the host satellite according to the present disclosure may be sufficiently rigid to be capable of transferring propulsive forces from the service satellite to the host satellite, or vice-versa. FIG. 3, for example, illustrates an interconnection 204 between service satellite 10 and host satellite 200.

According to the present disclosure, attaching the gripping mechanism of the service satellite to the host satellite may result in an interconnected unit having a combined center of mass. The term "interconnected unit" refers generally to an assembly formed by attaching, connecting, or coupling two objects. For example, attaching the gripping mechanism of the service satellite to the host satellite may form an interconnected unit or assembly that includes the service satellite and the host satellite. In some exemplary embodiments, the interconnected unit formed by connecting the service satellite to the host satellite may also be referred to as a "tandem assembly." FIG. 3, for example, illustrates an interconnected unit 206 formed by attaching gripping mechanism 14 of service satellite 10 to interface ring 202 of host satellite 200. It is to be noted that interconnected unit 206 may be formed by attaching some or all docking arms 16 of service satellite 10 to host satellite 200. Exemplary embodiments of the gripping mechanism consistent with the present disclosure are disclosed in International Patent Application No. PCT/IL2015/050856 filed on Aug. 26, 2015, and U.S. Provisional Patent Application No. 62/041,780, filed on Aug. 26, 2014, both of which are incorporated herein by reference in their entirety.

The term "combined center of mass" refers generally to a center of mass of two objects connected to each other. The combined center of mass of the interconnected unit formed by the service satellite and the host satellite may depend, for example, on the mass of the service satellite and the mass of the host satellite. The combined center of mass may also depend, for example, on how the mass of the service satellite and the mass of the host satellite are spatially distributed. Although the present disclosure does not contemplate calculating the spatial location of the combined center of mass of the interconnected unit, it is to be noted that the interconnected unit including the service satellite and the host satellite will necessarily have a combined center of mass.

A service satellite, in accordance with this disclosure, may include at least two thrusters. As used herein, a thruster generally refers to a device that can provide a propulsive force to move an object to which the thruster may be attached. In some exemplary embodiments, the thruster may force a propellant to flow out of the thruster generally in a predetermined direction, causing a propulsive force to be generated in a direction opposite to the predetermined direction. The propellant used by the thruster may be in liquid or gaseous form. The thruster according various embodiments of the present disclosure may be a chemical thruster, a resistor jet thruster, a cold gas thruster, an electric propulsion thruster, a bi-propellant thruster, a hall effect thruster, a gridded ion thruster, an arc jet thruster, a plasma propulsion engine, or any other type of thruster known in the art or which may be employed to move an object in space.

In accordance with embodiments of the present disclosure, the at least two thrusters may include a first pair of thrusters and a second pair of thrusters. As used herein, the term "pair" denotes two thrusters. It is to be noted, however, that the phrase "pair of thrusters" in the present disclosure is not limited to two thrusters that may be associated with each other mechanically, electrically, or in any other way. For example, the first pair of thrusters and the second pair of thrusters may collectively include four separate and independently controllable thrusters. While the present disclosure describes certain configurations and positions of thrusters, the disclosure in its broadest sense is not limited to particular thruster configurations or positions. Thus, for example, it is contemplated that in some exemplary embodiments, the service satellite may have an odd number of thrusters. It is further contemplated that in other exemplary embodiments, the service satellite of the present disclosure may have more than two pairs of thrusters.

In accordance with embodiments of the present disclosure, the at least two thrusters may include a first north thruster and a second north thruster. The first north thruster and the second north thruster may be disposed on a first side of the service satellite. The first north thruster may be spaced apart from the second north thruster. According to some embodiments of the present disclosure, the at least two thrusters may also include a first south thruster and a second south thruster. The first south thruster and the second south thruster may be disposed opposite the first side of the service satellite. The first south thruster may be spaced apart from the second south thruster. The terms north and south in their broadest sense are not limited to a particular position relative to the service satellite. Rather, in their broadest sense, the terms north and south denote opposite sides of the service satellite. The opposite sides may be disposed on either side of a coordinate plane passing through the body of the service satellite.

FIG. 1A illustrates an exemplary embodiment of a service satellite 10 having thrusters 36, 38, 40, and 42. As illustrated in FIG. 1A, thrusters 36 and 38 may be disposed on a first side 44 of body 12 of service satellite 10. For example, thrusters 36 and 38 may be disposed on first side 44 of a plane 46 passing through body 12. Thrusters 36 and 38 may be spaced apart from each other. In some exemplary embodiments, plane 46 may define a generally longitudinal plane of symmetry of service satellite 10. In other exemplary embodiments, plane 46 may define a zenith-nadir plane of the service satellite relative to the earth. As also illustrated in the exemplary embodiment of FIG. 1A, thrusters 40 and 42 may be disposed on a second side 48 of body 12 of service satellite 10. For example, thrusters 40 and 42 may be disposed on second side 48 of plane 46. Second side 48 of body 12 may be opposite first side 44.

In the exemplary embodiment illustrated in FIG. 1A, first side 44 may be identified as a north side of service satellite 10 and second side 48 may be identified as a south side of service satellite 10. Thrusters 36 and 38 may be labeled as first north thruster 36 and second north thruster 38. Likewise, thrusters 40 and 42 may be labeled as first south thruster 40 and second south thruster 42. It is to be noted, however, that in some embodiments, side 44 may be labeled as the south side and side 48 may be labeled as the north side of service satellite 10. In these exemplary embodiments, thrusters 36 and 38 may be labeled as first south thruster 36 and second south thruster 38, and thrusters 40 and 42 may be labeled as first north thruster 40 and second north thruster 42.

According to some aspects of the present disclosure, the first pair of thrusters may include the first north thruster and the first south thruster. Likewise, the second pair of thrusters may include the second north thruster and the second south thruster. FIG. 1A, for example, illustrates a first pair of thrusters 54, including thruster 36 and thruster 40, and a second pair of thrusters 56, including thruster 38 and thruster 42. In one exemplary embodiment, when first side 44 is labeled the north side and second side 48 is labeled the south side of service satellite 10, first pair of thrusters 54 may include first north thruster 36 and first south thruster 40. Likewise, second pair of thrusters 56 may include second north thruster 38 and second south thruster 42.

In some exemplary embodiment as illustrated in FIG. 1A, third side 58 may be identified as an east side of service satellite 10 and fourth side 60 may be identified as a west side of service satellite 10. Third side 58 and fourth side 60 may be disposed on opposite sides of a plane 62 passing through body 12 of service satellite 10. Plane 62 may be disposed generally perpendicular to plane 46. In some aspects of the present disclosure, plane 62 may be a plane of symmetry of service satellite 10. Thrusters 36 and 40 may be labeled as first east thruster 36 and second east thruster 40, which may be spaced apart from each other, and may be disposed on third side 58 of service satellite 10. Likewise, thrusters 38 and 42 may be labeled as first west thruster 38 and second west thruster 42, which may be spaced apart from each other, and may be disposed on a fourth side 60 of service satellite 10 opposite third side 58. It is to be noted, however, that in some embodiments, side 58 may be labeled as the west side and side 60 may be labeled as the east side of service satellite 10. In these exemplary embodiments, thrusters 36 and 40 may be labeled as first west thruster 36 and second west thruster 40, and thrusters 38 and 42 may be labeled as first east thruster 38 and second east thruster 42.

In accordance with the present disclosure, the service satellite may include a thruster deployment mechanism. The term "thruster deployment mechanism" refers generally to one or more structural elements attached to the service satellite and capable of extending outward and away from the body of the service satellite. The thruster deployment mechanism may include various alternative structures, so long as the structure is capable of deploying a thruster. In some exemplary embodiments according to the present disclosure, each thruster may have a dedicated thruster deployment mechanism. For example, each thruster may be attached to an extension arm or a boom that may have a first end attached to the body of the service satellite and a free end distal from the first end. The thruster may be attached to the free end of the extension arm or boom. In other exemplary embodiments according to the present disclosure, more than one thruster may be attached to the same extension arm or boom. In yet other exemplary embodiments, the thruster deployment mechanism may include one or more linkage mechanisms capable of positioning the thrusters at a predetermined distance from the body of the service satellite. For example, the thruster deployment mechanism may include two-, four-, or six-bar linkage mechanisms similar to those of the gripping mechanism discussed above.

Figure 2:
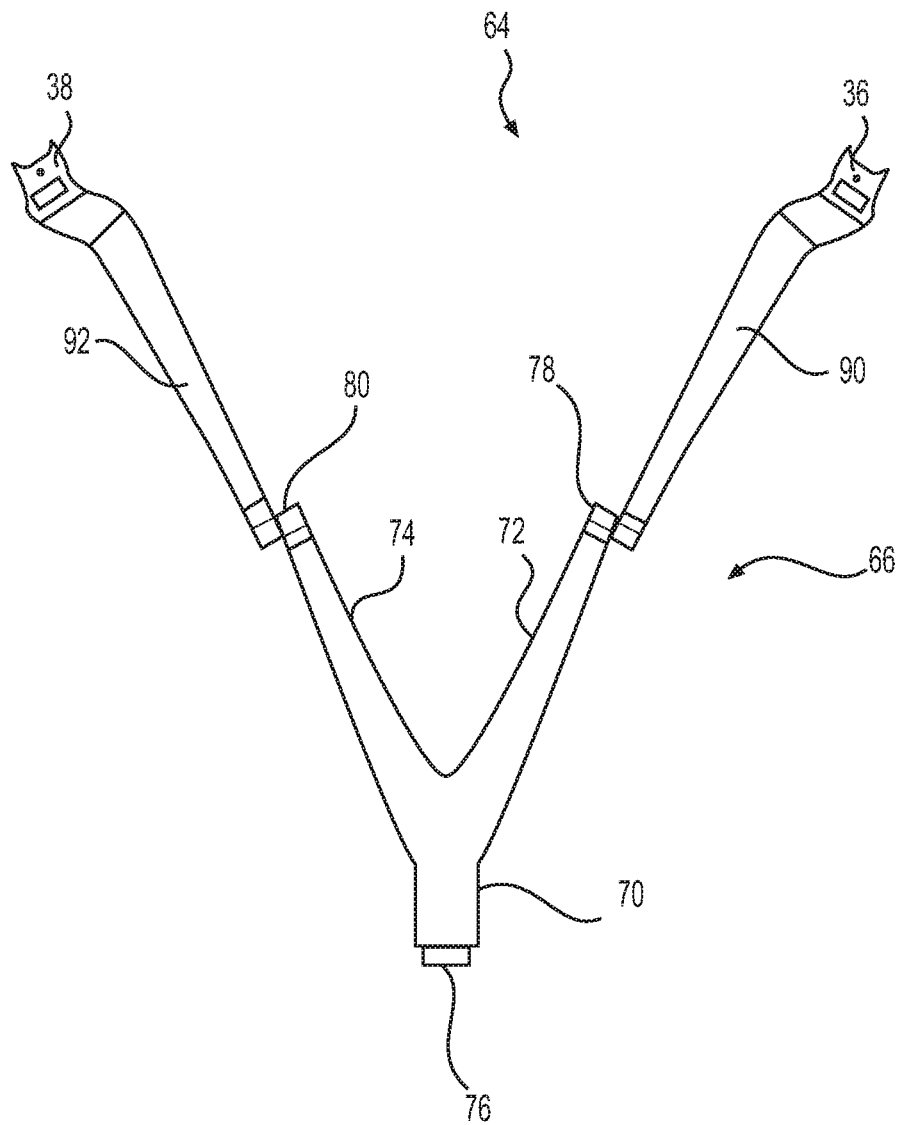
FIG. 2 illustrates a plan view of an exemplary thruster deployment mechanism of service satellite illustrated in FIG. 2A, consistent with disclosed embodiments.

FIG. 1A, for example illustrates a thruster deployment mechanism 64 of service satellite 10. Thruster deployment mechanism 64 may include thruster deployment yokes 66 (see FIG. 1A). As illustrated in FIG. 2, thruster deployment yoke 66 may include yoke base 70 and yoke arms 72, 74. Yoke base 70 may be rotatably connected to body 12 of service satellite 10 at yoke base end 76. Yoke arms 72, 74 may extend from yoke base 70 to yoke arm ends 78, 80, respectively. Yoke arm ends 78, 80 may be spaced apart from each other. In one exemplary embodiment as illustrated in FIGS. 2A and 2B, yoke base 70 and yoke arms 72, 74 may form a structural member having a generally "Y" shape. Although not illustrated in FIG. 2, thruster deployment yoke 68 (see FIG. 1A) may have a similar structure as described above with respect to thruster deployment yoke 66. Yoke base 70, and yoke arms 72, 74 may define yoke planes 86, 88 (see FIG. 1B). Although FIGS. 2A, and 2B illustrate each of thruster deployment yokes 66, 68 as having only two yoke arms 72, 74, it is contemplated that thruster deployment yokes 66, 68 may have any number of yoke arms. Additionally, although FIGS. 1A and 1B illustrate service satellite 10 as having only two thruster deployment yokes 66, 68, it is contemplated that service satellite 10 may have any number of thruster deployment yokes.

Returning to FIG. 1B, thruster deployment yokes 66, 68 may be oriented in an predetermined orientation by rotating thruster deployment yokes 66, 68 relative to plane 46 (see FIG. 1A). In one exemplary embodiment as illustrated in FIG. 1B, an orientation of thruster deployment yokes 66, 68 may be determined by an angle φ between yoke planes 86, 88, respectively, and planes parallel to plane 46 of service satellite 10. It is contemplated that thruster deployment yokes 66, 68 may be oriented at the same or different angles φ relative to plane 46.

In accordance with the present disclosure, the thruster deployment mechanism of the service satellite may also include one or more thruster positioning devices. As used herein, a thruster positioning device may include a structural member coupled to a thruster deployment yoke, capable of changing an orientation of a thruster. This may occur through mechanisms that rotate, tilt, pivot or otherwise redirect the thruster. The thruster may be attached to such a structural member. While the present disclosure describes a configuration having the thruster positioning device attached to a thruster deployment yoke, the disclosure in its broadest sense is not limited to the disclosed configuration. For example, it is contemplated that the thruster positioning device may be directly attached to the body of the service satellite. It is also contemplated that more than one thruster may be attached to each thruster positioning device. It is further contemplated that the service satellite may have any number of thruster positioning devices.

FIG. 1A illustrates exemplary thruster positioning devices, in this particular example, embodied in thruster arms 90, 92, 94, 96. As illustrated in FIG. 1A, for example, thruster arm 90 may include a first end 98 and a second end 100. First end 98 of thruster arm 90 may be rotatably attached to yoke arm end 78 of thruster deployment yoke 66. Thruster 36 may be fixedly attached to second end 100 of thruster arm 90. As also illustrated in FIG. 1A, for example, thruster arm 92 may include a first end 102 and a second end 104. First end 102 of thruster arm 92 may be rotatably attached to yoke arm end 80 of first thruster deployment yoke 66. Thruster 38 may be fixedly attached to second end 104 of thruster arm 92.

As further illustrated in FIG. 1A, for example, thruster arm 94 may include a first end 106 and a second end 108. First end 106 of thruster arm 94 may be rotatably attached to yoke arm end 82 of thruster deployment yoke 68. Thruster 40 may be fixedly attached to second end 108 of thruster arm 94. In addition, as illustrated in FIG. 1A, for example, thruster arm 96 may include a first end 110 and a second end 112. First end 110 of thruster arm 96 may be rotatably attached to yoke arm end 84 of thruster deployment yoke 68. Thruster 42 may be fixedly attached to second end 112 of thruster arm 96.

According to some embodiments of the present disclosure, an orientation of a thruster attached to a thruster arm may be determined by an angular displacement θ between the thruster arm and a plane of the thruster deployment yoke to which the thruster arm may be attached. Thus, for example, as illustrated in FIG. 1B, an orientation of thruster 36 may be determined by an angular displacement $\theta_1$ between thruster arm 90 and thruster deployment yoke 66. The angular displacement $\theta_1$ of thruster arm 90 may define a first position P1. Any of thrusters 36, 38, 40, and 42 may be oriented in position P1 by establishing an angular displacement $\theta_1$ between the corresponding thruster arm and thruster yoke. It is also contemplated that thrusters 36, 38, 40, 42 may be oriented at the same or different values of angular displacement θ. While the present disclosure describes a configuration in which an orientation of a thruster is determined by an angular displacement θ between a thruster arm and its corresponding thruster deployment yoke, the disclosure in its broadest sense is not limited to the disclosed configuration. For example, it is contemplated that the orientation of thrusters 36, 38, 38, 40 may be determined by angular displacements of thruster arms 90, 92, 94, 96, respectively, relative to plane 46. In other exemplary embodiments, the orientation of thrusters 36, 38, 38, 40 may be determined by angular displacements of thruster arms 90, 92, 94, 96, respectively, relative to plane 58. In yet other exemplary embodiments, the orientation of thrusters 36, 38, 38, 40 may be determined by angular displacements of thruster arms 90, 92, 94, 96 relative to any other surface of body 12 of service satellite 10.

In accordance with the present disclosure, the service satellite may include at least one controller. As used herein, the term controller refers to electrical or other elements capable of controlling various operations of the service satellite. For example, at least one controller may include a device that has suitable logic or computational components configured according to the requirements of a particular application. In some embodiments, the controller may include any physical device having an electric circuit that performs a logic operation on input or inputs. For example, the at least one controller may include a processor that has one or more integrated circuits, microchips, microcontrollers, microprocessors, all or part of a central processing unit (CPU), graphics processing unit (GPU), digital signal processor (DSP), field-programmable gate array (FPGA), or other circuits suitable for executing instructions or performing logic operations. The instructions executed by the controller may, for example, be preloaded into a memory unit integrated with or embedded into the controller or may be stored in a separate memory unit, such as a Random Access Memory (RAM), a Read-Only Memory (ROM), a hard disk, an optical disk, a magnetic medium, a flash memory, other permanent, fixed, or volatile memory, or any other mechanism capable of storing instructions for the controller. The one or more controllers may include single-core or multi-core processors based on the RISC, CISC, or any other computer instruction architecture.

In case more than one controller or processor is employed, all may be of similar construction, or they may be of differing constructions electrically connected or disconnected from each other. They may be separate circuits or integrated in a single circuit. When more than one controller or processor is used, they may operate independently or collaboratively. They may be coupled electrically, magnetically, optically, acoustically, mechanically or by other means permitting them to interact. In some embodiments, the at least one processor may be associated with a memory.

Memories associated with a controller or processor may include, for example, NOR or NAND flash memory devices, Read Only Memory (ROM) devices, Random Access Memory (RAM) devices, etc. The storage devices associated with a controller may include, for example, hard drives, solid state drives, etc.

The at least one controller, when located in orbit, may also be configured to communicate with one or more controllers located in a ground control station on earth via one or more telecommunications interfaces and other telecommunications circuitry. FIGS. 1A and 1B, for example, illustrate an exemplary controller 120.

In some aspects of the present disclosure, the controller may be located on-board the service satellite. In other aspects, the controller may be located at a ground control station on the earth. In yet other aspects of the present disclosure, the controller may be located on-board a spacecraft different from the service satellite. When the controller is located off-board the service satellite, the controller may be able to control various operations of the service satellite based on signals transmitted from the controller to the service satellite via one or more telecommunications interfaces or other telecommunications circuitry.

In accordance with the present disclosure, the at least one controller may be configured to maintain the interconnected unit in a substantially stationary orbit. As used herein, the term "stationary orbit" refers to a geostationary orbit around the earth. The host satellite in a geostationary orbit may have an allocated slot. The allocated slot may be defined by a first predetermined distance in an east-west direction (i.e. along the geostationary orbit), and a second predetermined distance in a north south direction (i.e. perpendicular to the geostationary orbit). Because of gravitational and solar forces exerted on the interconnected unit, the interconnected unit may move from its position in the geostationary orbit. Thrusters of the service satellite, host satellite, or both may be activated to counteract the gravitational or solar forces causing movement of the interconnected unit to move the host satellite within its allocated slot. Thus, as used herein, the phrase "substantially stationary orbit" may encompass movements of the interconnected unit in and about the allocated slot in the geostationary orbit.

The at least one controller may maintain the interconnected unit in a substantially stationary orbit by selectively moving each of the at least two thrusters to angular orientations such that during thruster firing, thrust vectors from each of the at least two thrusters avoid passing through the center of mass. In some exemplary embodiments, the controller may cause the thrusters to fire by, for example, ejecting propellant from the thrusters. As discussed above, ejecting propellant from a thruster may generate a reactionary force on the thruster in a direction opposite to that in which the propellant is ejected. As used herein, the term "thrust vector" refers generally to the combination of a magnitude of the reactionary force and a direction of the reactionary force applied on the thruster. It is to be noted that the reactionary force applied on the thruster will also be applied on the service satellite and on the interconnected unit when the service satellite is connected to a host satellite. The reactionary forces generated by the thrusters may cause the interconnected unit to travel in a direction corresponding to that of a vector sum of the thrust vectors generated by the selected thrusters.

The service satellite may be connected with any of a plurality of host satellites forming a plurality of interconnected units. Each such interconnected unit formed by connecting the service satellite to a host satellite may have a combined center of mass.

It is contemplated that in accordance with the present disclosure, the controller may be configured to orient the at least two thrusters such the thrust vectors from the at least two thrusters do not pass through any of the combined centers of mass corresponding to the plurality of interconnected units formed by connecting the service satellite with the plurality of host satellites. Indeed, according to various embodiments of the present disclosure, the thrust vectors from each of the at least two thrusters may be offset from the combined center of mass. As used herein, the term "offset" refers generally to a spatial separation. Thus, for example, the at least one controller may orient the selected thrusters such that the thrust vectors, from the selected thrusters may be spatially separated from the combined centers of mass corresponding to the plurality of interconnected units described above. While the present disclosure describes a configuration in which at least two thrusters are selected, the invention in its broadest sense is not limited to a particular configuration. For example, it is contemplated that the at least one controller may select one, two, or any number of thrusters for the above described maneuver. The at least one controller may be configured to orient the one or more selected thrusters such that thrust vectors generated by the selected thrusters do not pass through the combined centers of mass corresponding to the plurality of interconnected units described above.

Figure 4A:
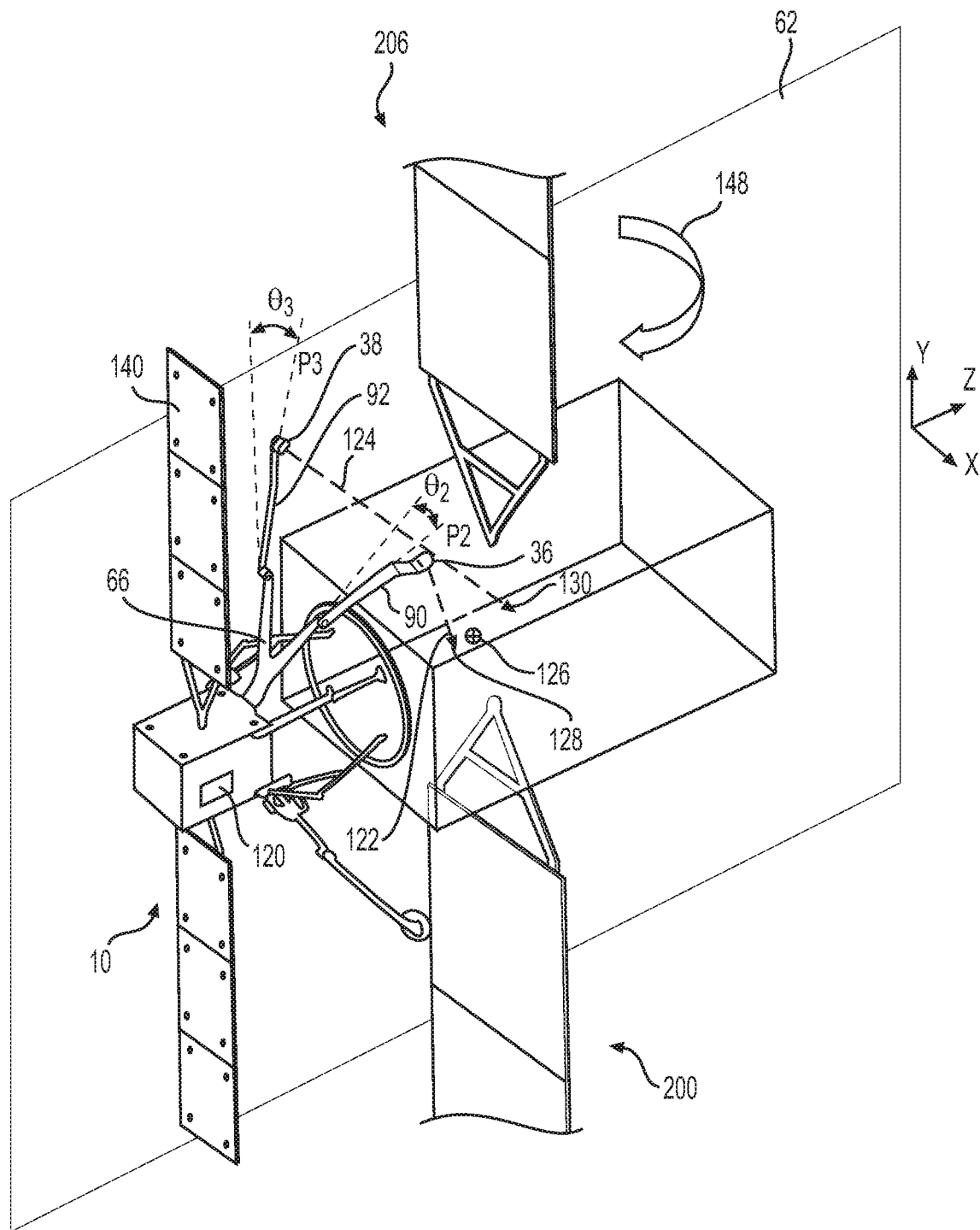
FIG. 4A illustrates a tandem assembly with an exemplary orientation of the thrusters of the service satellite of FIGS. 1A and 1B, consistent with disclosed embodiments.
Figure 4B:
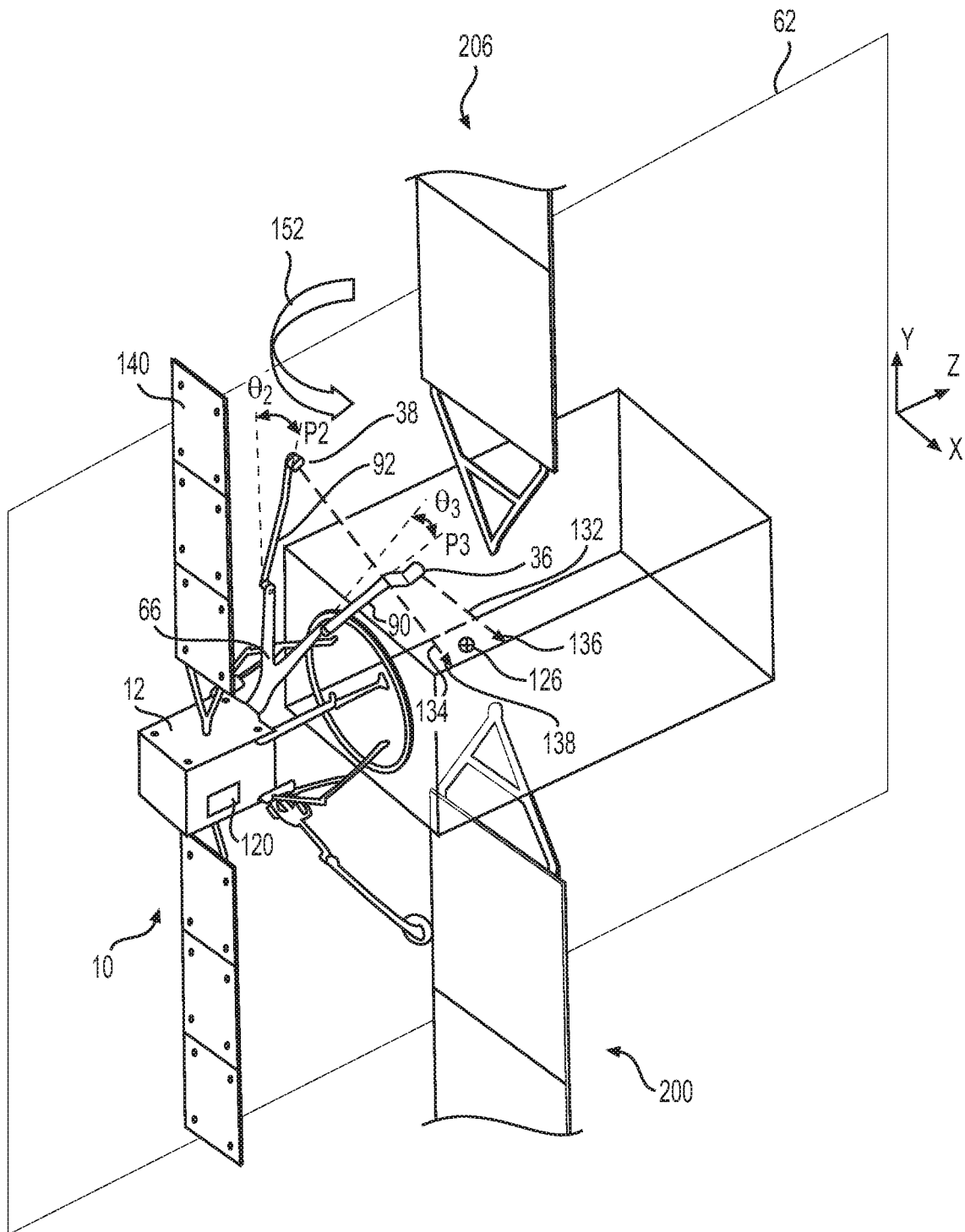
FIG. 4B illustrates a tandem assembly with another exemplary orientation of the thrusters of the service satellite of FIGS. 1A and 1B, consistent with disclosed embodiments.

FIGS. 4A and 4B illustrate an example of thruster firing such that the thrust vectors do not pass through a combined center of mass of an interconnected unit. For example, as illustrated in FIG. 4A, the at least one controller 120 may orient thruster arm 90 at an angular displacement $\theta_2$ relative to first thruster deployment yoke 66. In some embodiments, an angular displacement $\theta_2$ may define a position P2. As also illustrated in FIG. 4A, controller 120 may orient thruster arm 92 at an angular displacement $\theta_3$ relative to first thruster deployment yoke 66. In some embodiments, an angular displacement $\theta_3$ may define a position P3. Controller 120 may fire thrusters 36, 38. Firing thruster 36 may generate thrust vector 122 and firing thruster 38 may generate thrust vector 124. As illustrated in the exemplary embodiment of FIG. 4A, thrust vectors 122 and 124 may not pass through combined center of mass 126. It is contemplated that for the fixed thrust vector orientation in FIG. 4A, the service satellite 10 would be able to dock with a plurality of different host satellites, each having differing centers of mass, and the combined centers of mass in each instance would nevertheless fall between the thrust vectors 122, 124.

FIG. 4B illustrates another exemplary embodiment in which thruster arm 90 is oriented at an angular displacement $\theta_3$ (position P3) and thruster arm 92 is oriented at an angular displacement $\theta_2$ (position P2). Controller 120 may fire thrusters 36, 38. Firing thruster 36 may generate thrust vector 132 and firing thruster 38 may generate thrust vector 134. As illustrated in FIG. 4B, thrust vectors 132 and 134 do not pass through the combined center of mass 126. It is contemplated that for the fixed thrust vector orientation in FIG. 4A, the service satellite 10 would be able to dock with a plurality of different host satellites, each having differing centers of mass, and the combined centers of mass in each instance would nevertheless fall between the thrust vectors 132, 134.

Embodiments of the present disclosure may further include at least one controller configured to selectively move each of the at least two thrusters such that the combined center of mass is disposed between intersection points of the thrust vectors and a plane passing through the combined center of mass of the interconnected unit. The term "intersection point" refers to the location where a thrust vector intersects with a plane. In some exemplary embodiments according to the present disclosure, the plane may be a longitudinal plane passing through the interconnected unit, including the host satellite and the service satellite. Thrust vectors generated by firing the thrusters of the service satellite may intersect with the longitudinal plane at a plurality of positions. The at least one controller, according to the embodiments of the present disclosure, may orient the thrusters of the service satellite such that the combined center of mass of the service satellite and the host satellite may lie between the intersection points of the thrust vectors with the longitudinal plane.

FIG. 4A, for example, illustrates a configuration in which thruster arms 90, 92 may be oriented at angular displacements $\theta_2$, $\theta_3$, respectively, such that thrust vectors 122 and 124 may intersect with plane 62 at positions 128 and 130, respectively. As also illustrated in in the exemplary embodiment of FIG. 4A, the positions 128 and 130 may be offset or spatially separated from the combined center of mass 126. As further illustrated in FIG. 4A, the combined center of mass 126 may lie between intersection positions 128 and 130. Similarly, as illustrated in the exemplary embodiment of FIG. 4B, thruster arms 90, 92 may be oriented at angular displacements $\theta_3$, $\theta_2$, respectively, such that thrust vectors 132, 134 may intersect with plane 62 passing through the service satellite 10 and host satellite 200, at locations 136 and 138, which are offset (i.e. spatially separated) from combined center of mass 126. As illustrated in FIG. 4B, the combined center of mass 126 may lie between intersection positions 136 and 138.

Returning to FIGS. 1A and 1B, in some exemplary embodiments, service satellite 10 may include one or more solar panels 140, which may be attached to body 12 of service satellite 10. Solar panels 140 may be extendable outward from body 12 of service satellite 10. Solar panels 140 may be configured to be disposed generally perpendicular to a surface 142 of body 12 (see FIG. 1B). It is contemplated, however, that solar panels 140 may be tilted relative to surface 142 of body 12. Solar panels 140 may generate electrical power, which may be used for performing various operations associated with service satellite 10. For example, the power generated by solar panels 140 may be used to operate gripping mechanism 14, thruster deployment mechanism 64 (see FIGS. 2A, 2B), thrusters 36, 38, 40, 42, controller 120 and associated electrical circuitry etc. supplied to controller 120 and other electrical and telecommunication circuitry.

In accordance with embodiments of the present disclosure, the at least one controller may be further configured to adjust a thrust level of each of the at least two thrusters such that torques generated by the thrust vectors about at least one coordinate axis of the interconnected unit are substantially balanced. As used herein, the term "thrust level" refers to a magnitude of a reactionary force generated by a thruster. In some exemplary embodiments, the thrust level may be adjusted by controlling an amount of propellant ejected by a thruster in a predetermined amount of time. In other exemplary embodiments, the thrust level may be determined by a velocity at which the propellant is expelled from the thruster. As used herein, the term "torques" refers to a moment of the thrust vector generated by a thruster about an axis associated with the service satellite or the host satellite. The moment may be determined as a product of the thrust level and a perpendicular distance between the thrust vector and the axis. As also used herein, the term "balanced" refers to zeroing out the torques. Thus, for example, the at least one controller according to the present disclosure may select the thrust levels of at least two thrusters such that the torque generated by the thrust vector from one of the two thrusters is exactly equal and opposite to the torque generated by the thrust vector from the other of the two thrusters. A net torque resulting from a sum of the generated torques may be substantially equal to zero. It is also contemplated that in some exemplary embodiments, the balancing of torques may be achieved based on more than two thrusters.

FIGS. 4A and 4B, for example, illustrate configurations in which torques may be balanced. Thus, in the exemplary embodiment of FIG. 4A, controller 120 may orient thruster arms 90 and 92 at angular displacements $\theta_2$ (position P2) and $\theta_3$ (position P3), respectively. Controller 120 may fire thrusters 36 and 38 to generate thrust vectors 122, 124, respectively. Thrust vectors 122 and 124 may each generate a torque about a y co-ordinate axis of service satellite 10. An effect of the torques generated by thrust vectors 122, 124, in the form of a rotational force on interconnected unit 206, is illustrated in FIG. 4A by arrow 148.

Similarly in the exemplary embodiment illustrated in FIG. 4B, controller 120 may orient thruster arms 90 and 92 at angular displacements $\theta_3$ (position P3) and $\theta_2$ (position P2), respectively. Controller 120 may fire thrusters 36 and 38 to generate thrust vectors 132, 134, respectively. Thrust vectors 132 and 134 may each generate a torque about the y co-ordinate axis of service satellite 10. An effect of the torques generated by thrust vectors 132, 134, in the form of a rotational force on interconnected unit 206, is illustrated in FIG. 4B by arrow 152. Controller 120 may select thrust levels of thrusters 36 and 38 such that a magnitude and direction of a torque represented by arrow 148 (FIG. 4A) is exactly equal and opposite to a magnitude and direction of a torque represented by arrow 152 (FIG. 4B). Stated differently, controller 120 may select thrust levels of thrusters 36 and 38 such that a vector sum of the torques represented by arrows 148 and 152 may be substantially equal to zero. It is contemplated that the thrust levels of 36 and 38 may be equal or unequal.

Figure 5A:
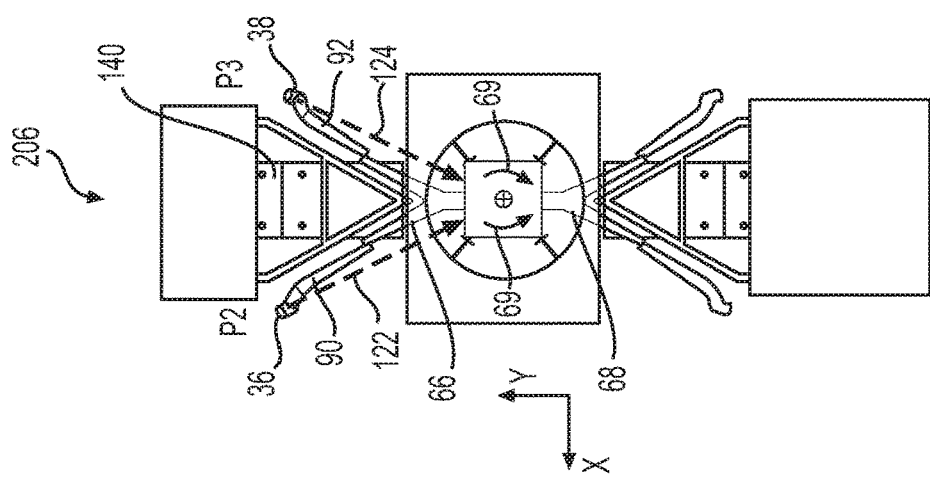
FIG. 5A illustrates an end view of an exemplary configuration of the interconnected unit of FIG. 3 along a z co-ordinate axis, consistent with disclosed embodiments.
Figure 5B:
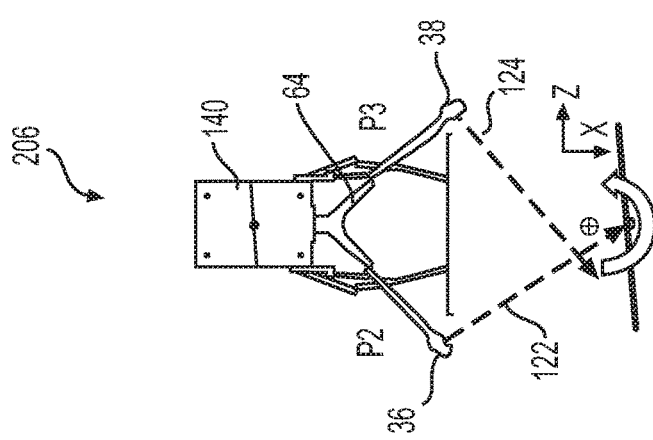
FIG. 5B illustrates a side view of an exemplary configuration of the interconnected unit of FIG. 3 along a y co-ordinate axis, consistent with disclosed embodiments.
Figure 5C:
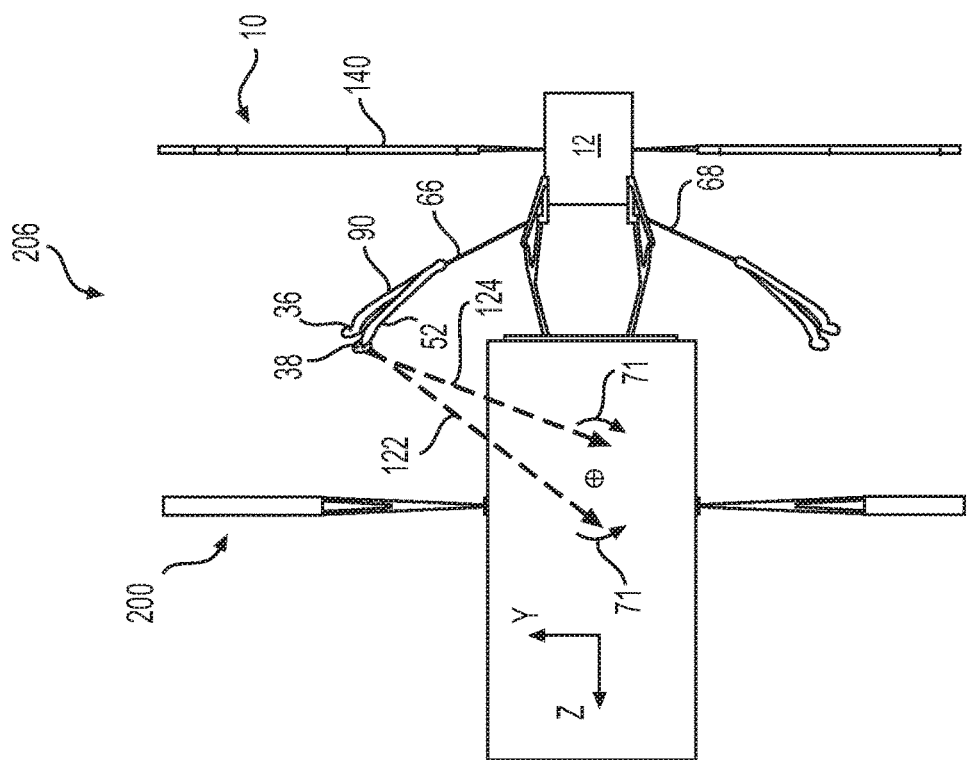
FIG. 5C illustrates a top view of an exemplary configuration of the interconnected unit of FIG. 3 along an x co-ordinate axis, consistent with disclosed embodiments.

FIGS. 5A, 5B, and 5C illustrate exemplary configurations in which torques may be balanced around two axes. FIG. 5A illustrates a view of interconnected unit 206 with a z co-ordinate axis disposed generally perpendicular to the frontal planar surface area illustrated in FIG. 5A. In some exemplary embodiments, as illustrated in FIG. 5A, the z axis in this figure may be a longitudinal axis that may pass along a center line of both service satellite 10 and host satellite 200 forming the interconnected unit 206. Thrusters 36 and 38 may be oriented in positions P2 and P3, respectively, similar to that illustrated in FIG. 4A. Controller 120 may select thrust levels for thrusters 36 and 38 so that torques generated about the z axis by thrust vectors 122, 124 may substantially balance each other out as shown by the two opposing arrows 69 in FIG. 5A.

Similarly, FIG. 5B illustrates a view of interconnected unit 206 in which a y coordinate axis may be disposed generally perpendicular to the frontal planar surface area illustrated in FIG. 5B. The y axis may also be generally perpendicular to the z axis. When thrusters 36 and 38 are in the P2 and P3 positions (see FIG. 4A), respectively, thrust vectors 122 and 124 may generate torques around the y-axis. These torques may be represented by the arrow shown in FIG. 5B and may be similar to arrow 148 in FIG. 4A. As will be described later, these torques may generate an angular momentum, which may be stored in a reaction wheel. When the positions of thrusters 36 and 38 are switched so that thruster 36 is in the P3 position and thruster 38 is in the P2 position (see FIG. 4B), the torques generated by thrust vectors 132 and 134, as illustrated in FIG. 4B, may unload the reaction wheel and deplete the stored angular momentum in the reaction wheel, thereby substantially balancing out the net torques generated about the y axis.

FIG. 5C illustrates a view of interconnected unit 206 in which an x co-ordinate axis may be disposed generally perpendicular to the frontal planar surface area illustrated in FIG. 5C. The x axis may also be generally perpendicular to the y and z axes. Thrusters 36 and 38 may be oriented in positions P2 and P3, respectively (see FIG. 4A). Controller 120 may select thrust levels for thrusters 36 and 38 so that torques generated about the x axis by thrust vectors 122, 124 may substantially balance each other out as shown by the two opposing arrows 71 in FIG. 5C.

In accordance with embodiments of the present disclosure, the controller may be configured to fire the at least two thrusters at a first thrust level when the first thruster is oriented at the first angular orientation. The controller may also be configured to fire the at least two thrusters at a second thrust level different from the first thrust level when the first thruster is oriented at the second angular orientation. In some exemplary embodiments, the controller may select the thrust levels for the thrusters based on their position and/or orientation. For example, the controller may fire a thruster at the P2 position at a first thrust level TH1 and fire a thruster at the P3 position at a second thrust level TH2. In other exemplary embodiments, the controller may fire both of the at least two thrusters at the first thrust level TH1, when the first thruster of the at least two thrusters is oriented in one of the P2 or P3 positions. The controller may fire both of the at least two thrusters at the first thrust level TH1, when the first thruster of the at least two thrusters is oriented in the other of the P2 or P3 positions. It is contemplated that the thrust levels TH1 and TH2 may be equal or unequal.

FIGS. 4A and 4B illustrate exemplary embodiments in which controller 120 may be configured to fire thrusters 36, 38, 40, 42 at different thrust levels. In the exemplary embodiment of FIG. 4A, controller 120 may orient thruster arms 90 and 92 at angular displacements $\theta_2$ (position P2) and $\theta_3$ (position P3), respectively. Controller 120 may fire thrusters 36 and 38 at thrust level TH1 to generate thrust vectors 122, 124, respectively. Controller 120 may fire both thrusters 36 and 38 at thrust level TH1 when thruster 36 is oriented at the P2 position. In the exemplary embodiment of FIG. 4B, controller 120 may orient thruster arms 90 and 92 at angular displacements $\theta_3$ (position P3) and $\theta_2$ (position P2), respectively. Controller 120 may fire thrusters 36 and 38 at thrust level TH2 to generate thrust vectors 132, 134, respectively. Controller 120 may fire both thrusters 36 and 38 at thrust level TH2 when thruster 36 is oriented at the P2 position.

In accordance with some embodiments of the present disclosure, the controller may be configured to determine the second thrust level. The controller may be configured to do so by firing the at least two thrusters at the first thrust level when the first thruster is oriented at the first angular orientation. The controller may also be configured to determine an angular momentum about the at least one coordinate axis of the interconnected unit. In addition, the controller may be configured to determine the second thrust level at which the at least two thrusters must be fired when the first thruster is oriented at the second angular orientation such that the angular momentum is substantially reduced to zero. As used herein, the term "angular momentum" refers to a product of a rotational inertia of an object and its rotational velocity about an axis of rotation. The controller may determine the angular momentum in many ways. In some exemplary embodiments, the controller may determine a rotational velocity or angular velocity of the interconnected unit based on sensors located in the service satellite or the host satellite. The controller may also determine a rotational inertia of the interconnected unit based on the mass distributions in the service satellite and the host satellite. The controller may determine an angular momentum of the interconnected unit based on the determined rotational velocity and rotational inertia. In other exemplary embodiments, the angular momentum may be determined by measurements using an angular momentum sensor. In yet other exemplary embodiments, the angular momentum may be determined based on a change of a rotational velocity of a reaction wheel associated with the service satellite or the host satellite.

FIGS. 4A and 4B illustrate exemplary embodiments in which the controller may be configured to determine the thrust levels based on angular momentum. In the exemplary embodiment of FIG. 4A, controller 120 may orient thruster arms 90 and 92 at angular displacements $\theta_2$ (position P2) and $\theta_3$ (position P3), respectively. Controller 120 may fire thrusters 36 and 38 at thrust level TH1 to generate thrust vectors 122, 124, respectively. Controller 120 may fire both thrusters 36 and 38 at thrust level TH1 when thruster arm 90 is oriented at angular displacements $\theta_2$ (position P2). Controller 120 may determine an angular momentum AM1 of the interconnected unit 206, including service satellite 10 and host satellite 200 about at least one co-ordinate axis of the service satellite. Thus, for example, controller 120 may determine the angular momentum AM1 generated about they axis as illustrated in FIG. 5B. Controller 120 may determine the angular momentum AM1 based on a mass distribution of the service satellite 10 and host satellite 200, angular velocities of the service satellite 10 and host satellite 200 about the y axis, and distances of various portions of the service satellite 10 and host satellite 200 from they axis. In some exemplary embodiments, controller 120 may determine the angular momentum AM1 using one or more angular momentum sensors in service satellite 10, and/or using one or more momentum wheels disposed in service satellite 10.

In the exemplary embodiment of FIG. 4B, controller 120 may orient thruster arms 90 and 92 at angular displacements $\theta_3$ (position P3) and $\theta_2$ (position P2), respectively. Controller 120 may determine the thrust level TH2 at which controller 120 must fire thrusters 36 and 38 so that the angular momentum AM2 generated about, for example, the y axis (as illustrated in FIG. 5B) is exactly equal and opposite to angular momentum AM1 developed as described above with respect to the embodiment of FIG. 4A. Controller 120 may fire both thrusters 36 and 38 at thrust level TH2 when thruster arm 90 is oriented at angular displacements $\theta_3$ (position P3) so that a total amount of momentum AM1+AM2 is about zero.

In accordance with embodiments of this disclosure, the at least one controller may be configured, during a first time period to position a first thruster of the at least two thrusters at a first angular orientation and fire the first thruster. The at least one controller may also be configured during the first time period to position a second thruster of the at least two thrusters at a second angular orientation different from the first angular orientation and fire the second thruster. The controller may position the thrusters in many different ways, and the invention, in its broadest sense, is not limited to any particular way. In one way, for example, the controller may position both thrusters at their respective positions simultaneously or sequentially. The controller may also fire both the thrusters simultaneously or sequentially. In some exemplary embodiments, the controller may position the first thruster at the first position and fire the first thruster for a first firing duration that may be smaller than the first period of time. After firing the first thruster for the first firing duration, the controller may position the second thruster at the second position and fire the second thruster for a second firing duration. In other exemplary embodiments, the controller may position both the first and the second thrusters at their respective first and second positions. After positioning both thrusters, the controller may simultaneously fire both first and second thrusters for their respective first and second firing durations.

FIG. 4A illustrates an exemplary embodiment in which the controller may be configured to position two thrusters and fire them during a first time period $T_1$. In the exemplary embodiment of FIG. 4A, controller 120 may orient thruster arm 90 at angular displacements $\theta_2$ (position P2). Controller 120 may fire thruster 36 for a firing duration $\Delta t_1$ smaller than first time period $T_1$. After time $\Delta t_1$ has elapsed, controller 120 may orient thruster arm 92 at angular displacement $\theta_3$ (position P3). Controller 120 may fire thruster 38 for a firing duration $\Delta t_2$, which may be smaller than first time period Controller 120 may select $\Delta t_1$ and $\Delta t_2$ such that the total time $\Delta t_1 + \Delta t_2$ may be smaller than the first time period $T_1$. Alternatively, controller 120 may simultaneously orient both thruster arms 90, 92 at angular displacements $\theta_2$ (position P2) and $\theta_3$ (position P3), respectively. After orienting thruster arms 90, 92, controller 120 may simultaneously or sequentially fire thrusters 36 and 38 for firing durations $\Delta t_1$ and $\Delta t_2$, respectively, such that each firing duration $\Delta t_1$ and $\Delta t_2$ may be smaller than the first time period $T_1$. The firing durations $\Delta t_1$ and $\Delta t_2$ may be equal or unequal.

In accordance with embodiments of this disclosure, the at least one controller may be configured, during a second time period following the first time period, to move the first thruster to assume the second angular orientation and fire the first thruster. The at least one controller may also be configured, during the second time period, to move the second thruster to assume the first angular orientation and fire the second thruster. In some embodiments of the disclosure, the controller may be configured to switch the positions of the first and second thrusters after the first time period. Thus, for example, the controller may be configured to position the first thruster at the second position and the second thruster at the first position during a second time period. The controller may position both thrusters at their respective positions simultaneously or sequentially. The controller may also fire both the thrusters simultaneously or sequentially. In some exemplary embodiments, the controller may position the first thruster at the second position and fire the first thruster for the second firing duration. After firing the first thruster for the second firing duration, the controller may position the second thruster at the first position and fire the second thruster for the first firing duration. In other exemplary embodiments, the controller may position both the first and the second thrusters at their respective second and first positions, respectively. After positioning both thrusters, the controller may fire both first and second thrusters for their respective second and first firing durations.

FIG. 4B illustrates an exemplary embodiment in which the controller may be configured to re-position two thrusters and fire them during a second time period $T_2$. In the exemplary embodiment of FIG. 4B, after the first time period $T_1$ has elapsed, controller 120 may orient thruster arm 90 at angular displacements $\theta_3$ (position P3). Controller 120 may fire thruster 36 for a firing duration $\Delta t_3$ smaller than the second time period $T_2$. After firing duration $\Delta t_3$ has elapsed, controller 120 may orient thruster arm 92 at angular displacement $\theta_2$ (position P2). Controller 120 may fire thruster 38 for a firing duration $\Delta t_4$, which may be smaller than second time period $T_2$. Controller 120 may select $\Delta t_3$ and $\Delta t_4$ such that the total firing duration $\Delta t_3 + \Delta t_4$ may be smaller than the second time period $T_2$. Alternatively, controller 120 may simultaneously orient both thruster arms 90, 92 at angular displacements $\theta_3$ (position P3) and $\theta_2$ (position P2), respectively. After orienting thruster arms 90, 92, controller 120 may simultaneously or sequentially fire thrusters 36 and 38 for firing durations $\Delta t_3$ and $\Delta t_4$, respectively, such that each of $\Delta t_3$ and $\Delta t_4$ may be smaller than the second time period $T_2$. Firing durations $\Delta t_3$ and $\Delta t_4$ may be equal or unequal. Firing durations $\Delta t_3$ and $\Delta t_4$ may also be equal to or different from any of firing durations $\Delta t_1$ and $\Delta t_2$.

In accordance with the present disclosure, the at least one controller may be further configured to move one of the first pair of thrusters and the second pair of thrusters to a first angular orientation. In some exemplary embodiments according to the present disclosure, the service satellite may have more than one pair of thrusters. In these exemplary embodiments, the controller may be configured to move one pair of thrusters so that both thrusters in that pair have the same orientation. The controller may orient the two thrusters in that first pair by adjusting the positions of the thruster deployment mechanisms associated with the two thrusters.

The at least one controller in accordance with the present disclosure may also be configured to move another of the first pair of thrusters and the second pair of thrusters to a second angular orientation different from the first angular orientation. In some exemplary embodiments, the controller may select a second pair of thrusters different from the first pair. The controller may be configured to move the second pair of thrusters so that both thrusters in that second pair have the same orientation. The controller may orient the two thrusters in the second pair of thrusters by adjusting the positions of the thruster deployment mechanisms associated with the two thrusters in the second pair of thrusters.

In accordance with the present disclosure, the controller may be configured to select the first and second angular orientations such that the thrust vectors from the first pair of thrusters and the second pair of thrusters avoid passing through the combined center of mass and are offset from the combined center of mass. This may be accomplished, for example, when at least one controller adjusts the positions of one or more structural elements of the thruster deployment mechanisms associated with the first and second pair of thrusters such that when the first and second pair of thrusters are fired, the thrust vectors generated by both the first pair of thrusters and the second pair of thrusters do not pass through a combined center of mass of the service satellite and the host satellite. In some exemplary embodiments, the controller may select the orientation of the first pair of thrusters and the second pair of thrusters such that the thrust vectors from the first and second pair of thruster are spatially separated (i.e. offset) from the combined center of mass of the service satellite and the host satellite. In other exemplary embodiments, the controller may select the orientation of the first pair of thrusters and the second pair of thrusters such that the thrust vectors from the first and second pair of thrusters do not pass through any of a plurality of combined centers of mass that may result by connecting the service satellite to a plurality of host satellites, where each host satellite has a differing center of mass.

Figure 6A:
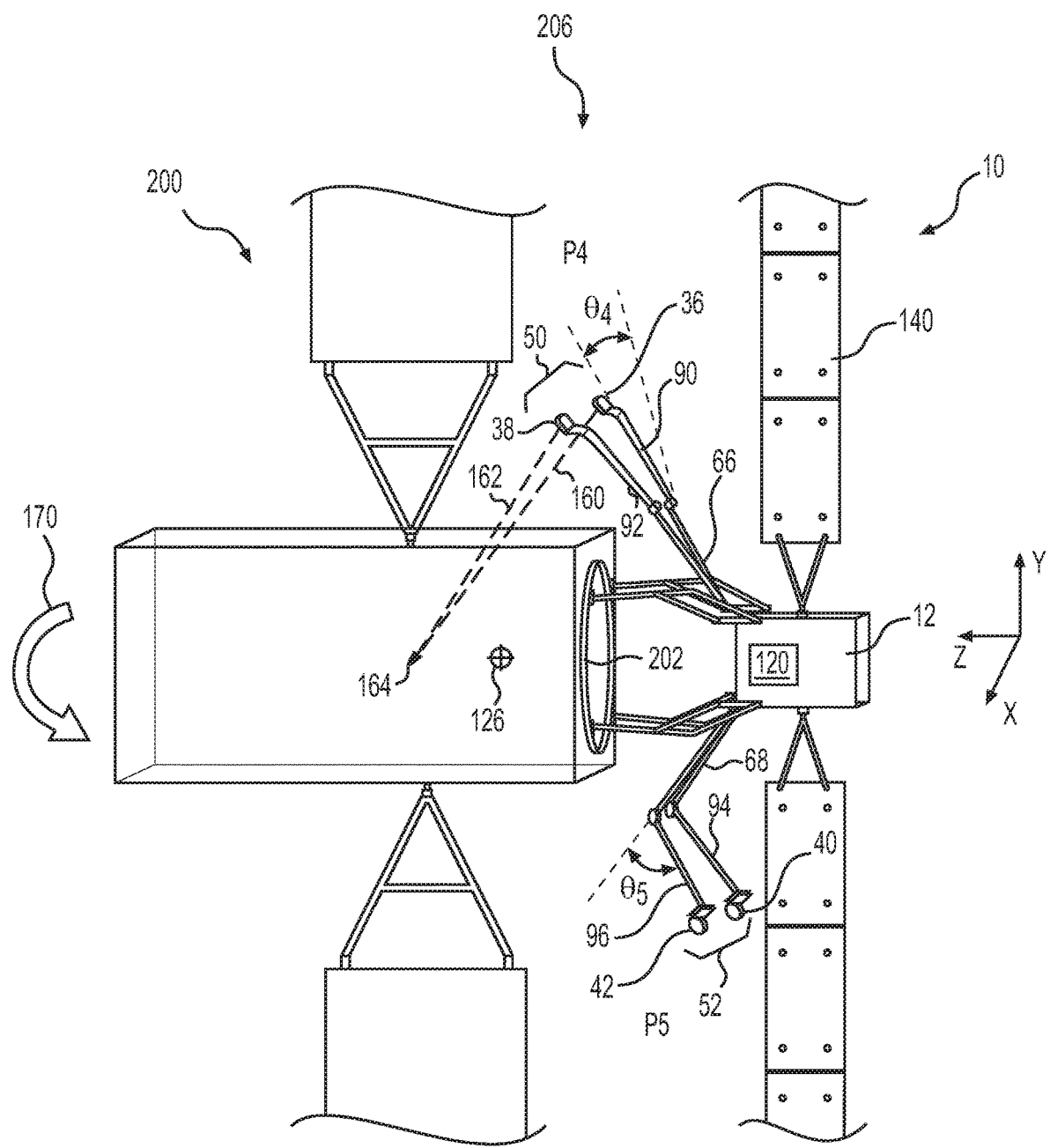
FIG. 6A illustrates a tandem assembly with an exemplary orientation of the thrusters of the service satellite of FIGS. 1A and 1B, consistent with disclosed embodiments.
Figure 6B:
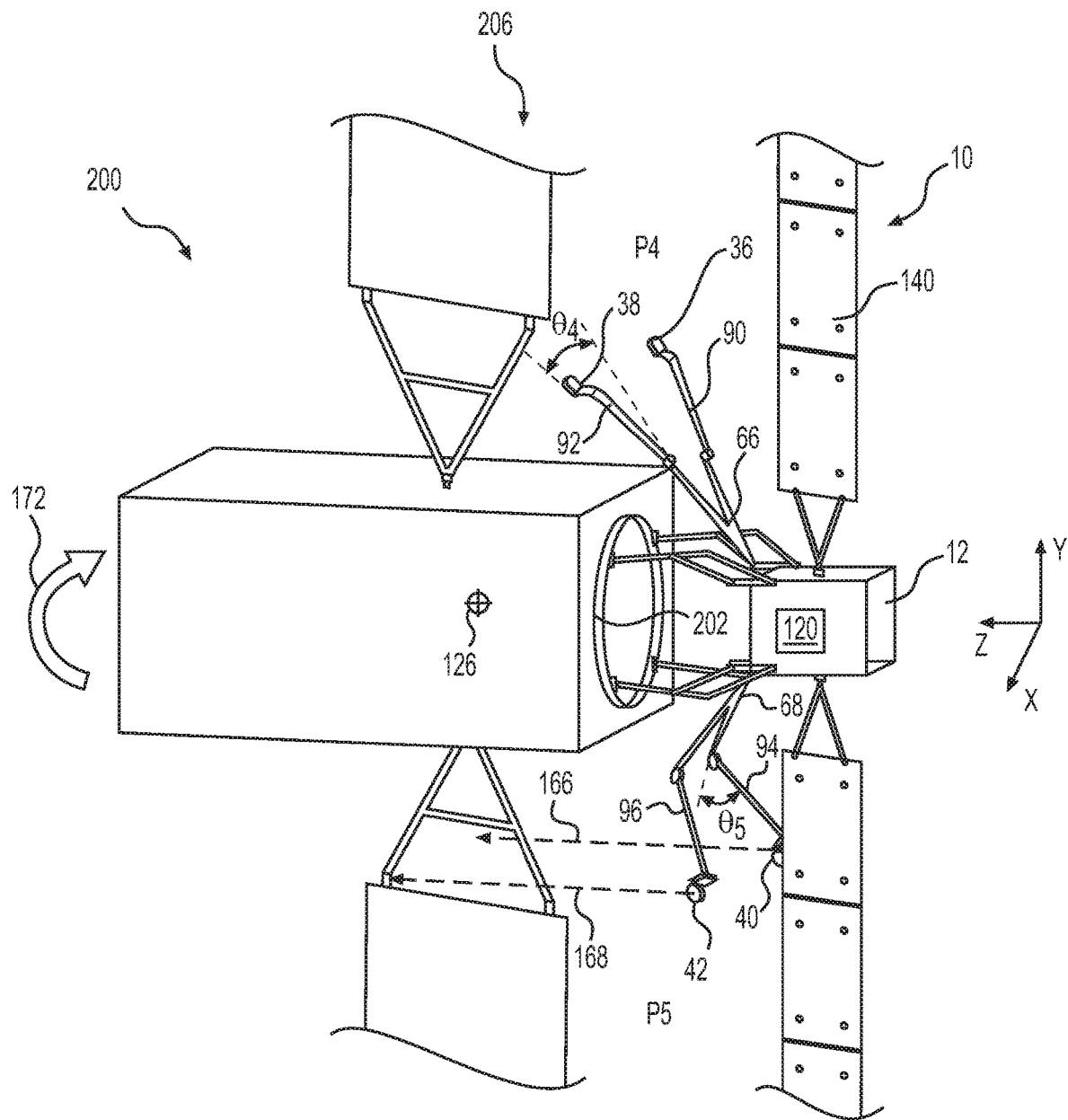
FIG. 6B illustrates a tandem assembly with another exemplary orientation of the thrusters of the service satellite of FIGS. 1A and 1B, consistent with disclosed embodiments.

FIGS. 6A and 6B illustrate exemplary embodiments in which the controller may be configured to orient the first and second pair of thrusters at different orientations. For example, as illustrated in FIG. 6A, the at least one controller 120 may orient first pair of thrusters 50 in a first orientation. Controller 120 may orient thruster arm 90 at an angular displacement $\theta_4$ relative to first thruster deployment yoke 66. Angular displacement $\theta_4$ may define a P4 position for thruster 36. Controller 120 may also orient thruster arm 92 at the angular displacement $\theta_4$ relative to first thruster deployment yoke 66. Thus, for example, both thrusters 36 and 38 may be in the P4 position when thruster arms 90, 92 are oriented at an angular displacement $\theta_4$. Controller 120 may fire thrusters 36, 38. Firing thruster 36, 38 may generate thrust vectors 160, 162, respectively. As illustrated in FIG. 6A, thrust vectors 160, 162 may not pass through combined center of mass 126 of interconnected unit 206. In some exemplary embodiments as illustrated in FIG. 6A, thrust vectors 160, 162 may intersect with each other at intersection point 164, which may be offset (i.e. spaced apart) from combined center of mass 126. It is contemplated that for the fixed thrust vector orientation in FIG. 6A, the service satellite 10 would be able to dock with a plurality of different host satellites, each having differing centers of mass, and the intersection point 164 would be spatially separated from the combined centers of mass of all such tandem assemblies, regardless of the precise location of the combined center of mass in each instance.

As illustrated in FIG. 6B, the at least one controller 120 may orient second pair of thrusters 52 in a second orientation. For example, controller 120 may orient thruster arm 94 at an angular displacement $\theta_5$ relative to second thruster deployment yoke 68. Angular displacement $\theta_5$ may define a P5 position for thruster 40. Controller 120 may also orient thruster arm 96 at the angular displacement $\theta_5$ relative to second thruster deployment yoke 68. Thus, for example, thrusters 40 and 42 may be in a P5 position when thruster arms 94, 96 are oriented at an angular displacement $\theta_5$. Controller 120 may fire thrusters 40, 42. Firing thruster 36, 38 may generate thrust vectors 166, 168, respectively. As illustrated in FIG. 6B, thrust vectors 166, 168 may not pass through combined center of mass 126 of interconnected unit 206. In some exemplary embodiments as illustrated in FIG. 6B, thrust vectors 166, 168 may be generally parallel to each other and may be spaced apart from combined center of mass 126. Regardless of the particular center of mass of the host satellite, it is similarly contemplated that there will be a universal orientation of thrusters such that the thrust vectors 166, 168 would be spaced apart from any combined center of mass, regardless of the location of the combined center of mass of the tandem assembly.

In accordance with embodiments of the present disclosure, the at least one controller may be configured to fire thrusters located at the first angular orientation at a first thrust level. The at least one controller may also be configured to fire thrusters located at the second angular orientation at a second thrust level different from the first thrust level, such that torques generated by the thrust vectors about at least one axis of the interconnected unit are substantially balanced. In some exemplary embodiments according to the present disclosure, the at least one controller may select the thrust levels of the first pair of thrusters and the second pair of thrusters. The controller may select the thrust levels such the torque generated by the thrust vectors from the first pair of thrusters about an axis of the service satellite is exactly equal and opposite to the torque generated by the thrust vectors from the second pair of thrusters of the two thrusters.

FIGS. 6A and 6B, for example, illustrate configurations that controller 120 may use to balance the torques. Thus, for example, in the exemplary embodiment of FIG. 6A, controller 120 may orient both thruster arms 90 and 92 at the same angular displacement $\theta_4$ (position P4). Controller 120 may fire thrusters 36 and 38 to generate thrust vectors 160, 162, respectively. Thrust vectors 160 and 162 may generate a torques about, for example, an x axis, which may be disposed generally perpendicular to plane 62 (see FIG. 4B). A rotational force exerted on interconnected unit 206 as a result of the generated torques may be represented by arrow 170

Similarly in the exemplary embodiment illustrated in FIG. 6B, controller 120 may orient both thruster arms 94 and 96 at the same angular displacement $\theta_5$ (position P5). Controller 120 may fire thrusters 40 and 42 to generate thrust vectors 168, 170, respectively. Thrust vectors 168 and 170 may generate torques about, for example, the x axis. A rotational force exerted on interconnected unit 206 as a result of the generated torques may be represented by arrow 172. Controller 120 may select thrust levels of thrusters 36, 38, 40, and 42 such that the torque represented by arrow 170 is exactly equal and opposite to the torque represented by arrow 172, thereby balancing or zeroing out a net torque around the x axis. It is contemplated that the thrust levels of thrusters 36, 38, 40, and 42 may be equal or unequal.

In some exemplary embodiments according to the present disclosure, the at least one controller may be configured to simultaneously fire the first pair of thrusters for a first time duration. The at least one controller may also be configured to simultaneously fire the second pair of thrusters for a second time duration. The term "simultaneously," as used herein, indicates that the two thrusters included in the first or the second pair of thrusters are fired at about the same time and for about the same duration. The term "simultaneously" covers embodiment in which there may be short time differences (of the order of, for example, 0.5 seconds) between a time at which firing initiates or ceases from each of the two thrusters included in the first or second pair of thrusters. The term "simultaneously also covers situations where during thruster firing, each thruster is pulsed, and individual thruster firing alternated, such that while multiple thrusters are fired in a same time duration, there may not be overlap of firing within the time duration. The at least one controller may select the first and second time durations and the thrust levels of the first and second pair of thrusters such that torques generated by the first and second pairs of thrusters about at least one axis of the service satellite are zeroed out. The first time duration and the second time duration may be equal or unequal.

FIGS. 6A and 6B, for example, illustrate configurations in which controller 120 may simultaneously fire the first or second pair of thrusters. For example, when thrusters 36 and 38 are oriented in the P4 orientation, as illustrated in FIG. 6A, controller 120 may fire thrusters 36 and 38 simultaneously for a first time duration $T_1$. Likewise, when thrusters 40 and 42 are oriented, for example, in the P5 orientation, as illustrated in FIG. 6B, controller 120 may fire thrusters 40 and 42 simultaneously for a second time duration $T_2$. The time durations $T_1$ and $T_2$ may be equal or unequal.

In accordance with embodiments of the present disclosure, the controller may be further configured to move the first pair of thrusters to the second angular orientation and the second pair of thrusters to the first angular orientation after a third time duration. The controller may also be configured to simultaneously fire the second pair of thrusters for the first time duration after moving the first pair of thrusters and the second pair of thrusters. In some exemplary embodiments, the controller may begin evaluating the third time duration after the first time duration and the second time duration have elapsed. In these embodiments, the third time duration may be zero or non-zero. In other exemplary embodiments, the controller may begin evaluating the third time duration from the time when the first pair of thrusters begin to fire. In these embodiments, the third time duration may be about equal to greater than at least a sum of the first and second time duration.

Figure 7A:
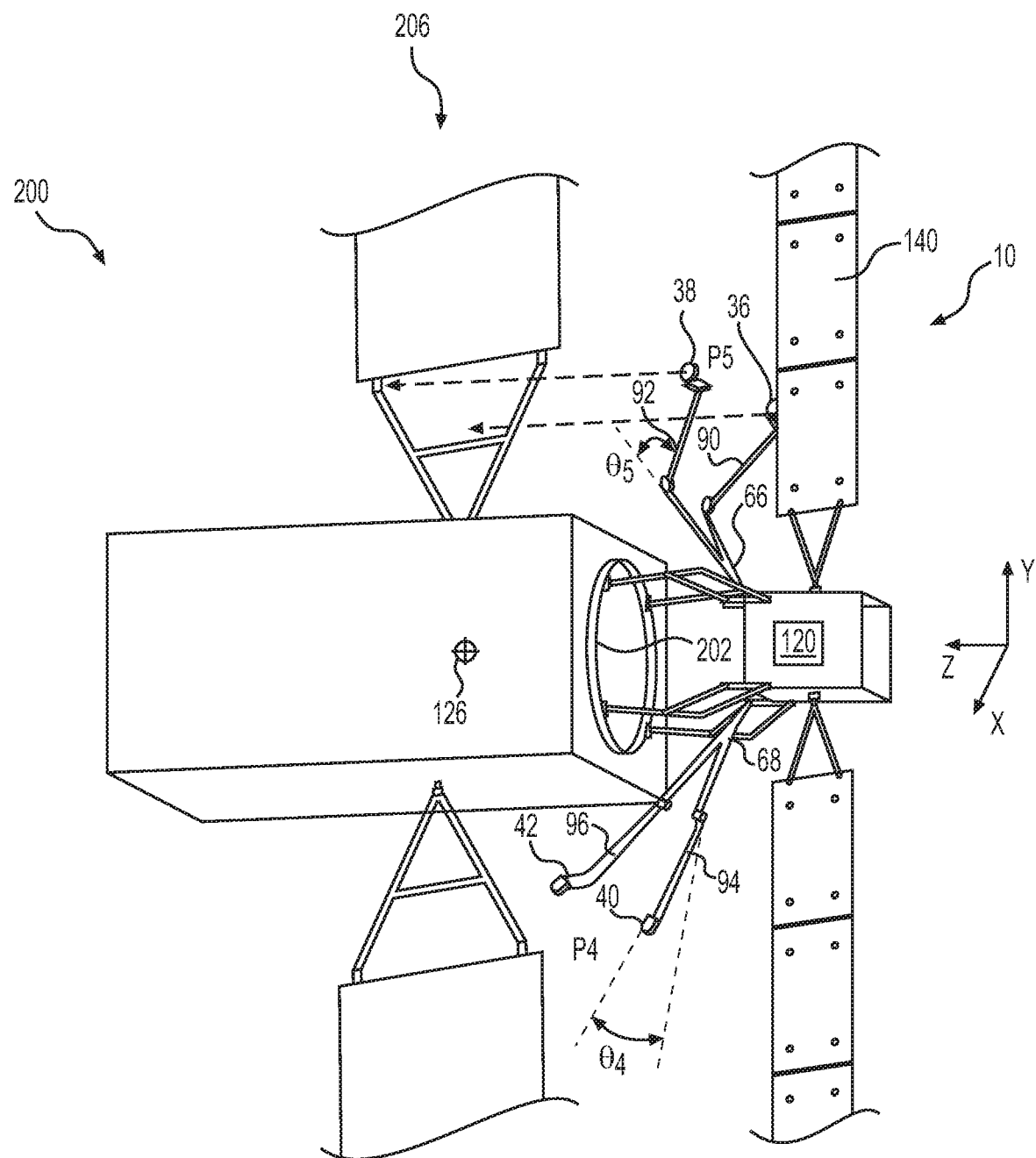
FIG. 7A illustrates a tandem assembly with yet another exemplary orientation of the thrusters of the service satellite of FIGS. 1A and 1B, consistent with disclosed embodiments.
Figure 7B:
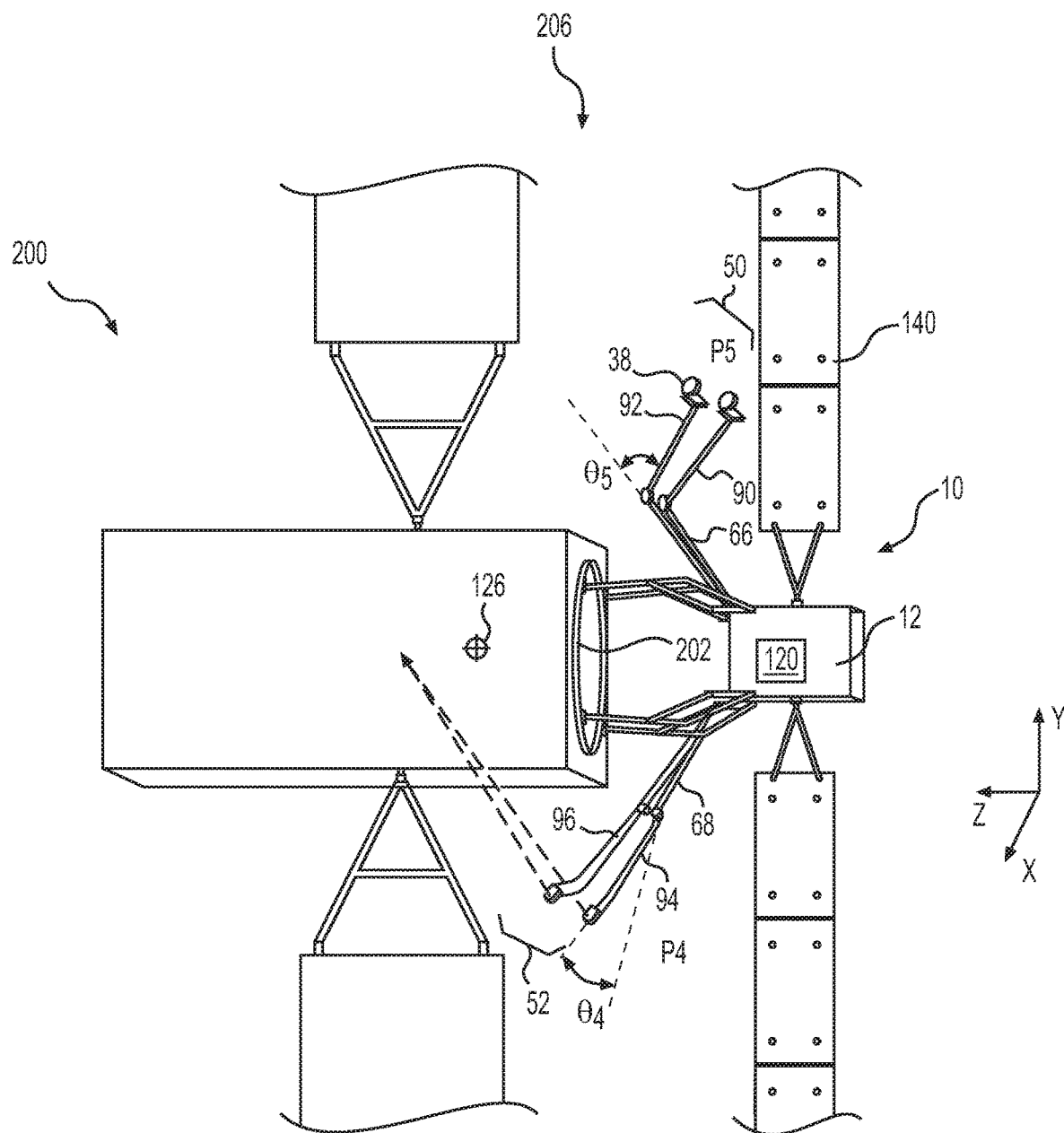
FIG. 7B illustrates a tandem assembly with a further exemplary orientation of the thrusters of the service satellite of FIGS. 1A and 1B, consistent with disclosed embodiments.

By way of non-limiting examples, FIGS. 7A and 7B illustrate the positions of the first and second pair of thrusters after a third time duration $T_3$. In the exemplary embodiment of FIG. 7A, controller 120 may orient both thruster arms 90 and 92 at the same angular displacement $\theta_5$ (position P5). Controller 120 may fire thrusters 36 and 38 for the first time duration $T_1$. As illustrated in the exemplary embodiment of FIG. 7B, controller may orient both thruster arms 94 and 96 at the same angular displacement $\theta_4$ (position P4). Controller 120 may fire thrusters 40 and 42 for the second time duration $T_2$.

According to some embodiments of the present disclosure, the at least one controller may be configured to fire thrusters located at the first angular orientation at a predetermined thrust level for a first time duration. The controller may also be configured to fire thrusters located at the second angular orientation at the predetermined thrust level for a second time duration different from the first time duration, such that torques generated by the thrust vectors about at least one axis of the interconnected unit are substantially balanced. In some exemplary embodiments, the first and second time durations may be equal. In other exemplary embodiments, the first and second time durations may be unequal. It is also contemplated that in some exemplary embodiment, the controller may fire the first and second pair of thrusters simultaneously.

By way of non-limiting examples, FIGS. 6A and 6B illustrate the configuration of the first and second pair of thrusters. As illustrated in the exemplary embodiment of FIG. 6A, controller 120 may orient both thruster arms 90 and 92 at the same angular displacement $\theta_4$ (position P4). Controller 120 may fire thrusters 36 and 38 at a predetermined thrust level $TH_{PRE}$ for a first time duration $T_1$. As illustrated in the exemplary embodiment of FIG. 6B, controller 120 may orient both thruster arms 94 and 96 at the same angular displacement $\theta_5$ (position P5). Controller 120 may fire thrusters 40 and 42 at the predetermined thrust level $TH_{PRE}$ for a second time duration $T_2$.

In accordance with some embodiments of this disclosure, the controller may be configured to determine the second time duration. The controller may be configured to do so by firing thrusters positioned at the first angular orientation at the predetermined thrust level for the first time duration. The controller may also be configured to determine an angular momentum about at least one coordinate axis of the interconnected satellite. Further, the controller may be configured to determine the second time duration for which thrusters positioned at the second angular orientation must be fired to decrease the angular momentum substantially to zero.

By way of non-limiting examples in FIGS. 6A and 6B, controller 120 may orient both thruster arms 90 and 92 at the same angular displacement $\theta_4$ (position P4). Controller 120 may fire thrusters 36 and 38 at a predetermined thrust level $TH_{PRE}$ for a first time duration $T_1$. Controller 120 may determine an amount of angular momentum AM1 generated about, for example, an x axis of the interconnected unit 206 (see FIG. 5C). Controller 120 may determine the second duration of time $T_2$ of firing thrusters 40, 42 at the predetermined thrust level $TH_{PRE}$, such that angular momentum AM2 generated by thrust vectors 168, 170 about the x axis is exactly equal to and of opposite sign as angular momentum AM1. In other words, controller 120 may determine time $T_2$ such that the net angular momentum AM1+AM2 is substantially zero.

In some exemplary embodiment of the present disclosure, the first time duration is an amount of time after which a reaction wheel of the service satellite is fully loaded, and the second time duration is the amount of time after which the reaction wheel is fully unloaded. Some aspects of the present disclosure may include one or more reaction wheels located on-board the service satellite. As used herein, the term "reaction wheel" refers to a device capable of storing angular momentum. In some exemplary embodiments, a reaction wheel may include a flywheel capable of rotating about an axis of rotation. A reaction wheel may store angular momentum by an accompanying increase in a rotational speed of the flywheel. A reaction wheel may have a predetermined minimum rotational speed and a predetermined maximum rotational speed and may be deemed to be fully loaded when it has reached its predetermined maximum rotational speed.

By way of non-limiting examples, as illustrated in FIG. 6A, controller 120 may orient both thruster arms 90 and 92 at the same angular displacement $\theta_4$ (position P4). Controller 120 may fire thrusters 36 and 38 at a predetermined thrust level $TH_{PRE}$ until a reaction wheel in service satellite 10 is fully loaded (i.e. reaches it predetermined maximum rotational speed). The time duration required for the reaction wheel to be fully loaded may be a first time duration $T_1$. After, the reaction wheel is fully loaded, controller 120 may stop firing thrusters 36, 38 and instead commence firing thrusters 40, 42 (see FIG. 6B). Controller 120 may continue to fire thrusters 40, 42 until the reaction wheel is fully unloaded (i.e. reaches its predetermined minimum rotational speed). The time duration required for the reaction wheel to be fully unloaded may be a second time duration $T_2$.

According to some exemplary embodiments of the present disclosure, the controller may be configured to sequentially fire the first pair of thrusters and the second pair of thrusters. By way of non-limiting examples in FIGS. 6A and 6B, after orienting thruster arms 90, 92, 94, and 96, controller 120 may initiate firing from thrusters 36 and 38 for the first time duration $T_1$. After the first time duration has elapsed, controller 120 may initiate firing from thrusters 40 and 42 for the second time duration $T_2$. Thus, controller 120 may fire the second pair of thrusters 40, 42, sequentially after firing the first pair of thrusters 36, 38.

In accordance with embodiments of the present disclosure, in a third time duration after the second time duration, the controller may be configured to move the first pair of thrusters to the second angular orientation and the second pair of thrusters to the first angular orientation. The controller may also be configured to sequentially fire the first pair of thrusters and the second pair of thrusters after moving the first pair of thrusters and the second pair of thrusters. After firing thrusters 36 and 38 for the first time duration $T_1$, and after firing thrusters 40 and 42 for the second time duration $T_2$, controller 120 may be configured to switch the positions of thrusters 36, 38, 40, and 42 during a third time duration $T_3$. Thus, for example, controller 120 may change the orientation of thruster arms 90 and 92 from the angular displacement $\theta_4$ (position P4) (as in FIG. 6A) so that thruster arms 90 and 92 are oriented at the angular displacement $\theta_5$ (position P5) (as in FIG. 7A). Likewise, controller 120 may change the orientation of thruster arms 94 and 96 from the same angular displacement $\theta_5$ (position P5) (as in FIG. 6A) to the angular displacement $\theta_4$ (position P4) (as in FIG. 7A) during the time duration $T_3$. Controller 120 may change the orientations of thruster arms 90, 92, 94, and 96 simultaneously or sequentially in any order. After re-orienting thruster arms 90, 92, 94, and 96, controller 120 may fire either thrusters 36, 38 or thruster 40, 42 at the predetermined thrust level $TH_{PRE}$ for a first time duration $T_1$. After time duration $T_1$ has elapsed, controller 120 may fire the other pair of thrusters 36, 38 or thruster 40, 42 at the predetermined thrust level $TH_{PRE}$ for a second time duration $T_2$.

The present disclosure may also relate to a method of providing station keeping services to a host satellite. As discussed above, station keeping may include maneuvers associated with providing compensatory displacements required to maintain the host satellite in its allocated position in the geostationary orbit. In some exemplary embodiments the method may include launching a service satellite into space and maneuvering it to within docking distance of the host satellite. The term "launching" refers generally to a transfer of the service satellite into an orbit in space. According to some aspects of the present disclosure, the service satellite may be launched into space on a launch vehicle or rocket that travels from the earth into space. The launch vehicle or rocket may release the service satellite into a predetermined orbit in space. According to other aspects of the present disclosure, the service satellite may be taken to space on a reusable launch vehicle, for example, a space shuttle. The satellite may be released from the space shuttle into the predetermined orbit by the space shuttle. The service satellite might be a micro satellite, enabling it to be launched into space in a common launch vehicle with other satellites or with other payloads.

According to some exemplary embodiments of the present disclosure, the method of providing station keeping services to the host satellite may include connecting the service satellite to the host satellite to form an interconnected unit by engaging at least two arms of the service satellite with an external interface ring of the host satellite. The interconnected unit may have a combined center of mass. In some exemplary embodiments, the method may also include selectively moving each of at least two thrusters of the service satellite for firing during station keeping maneuvers, such that thrust vectors from the at least two thrusters avoid passing through the combined center of mass and are offset from the combined center of mass.

Figure 8:
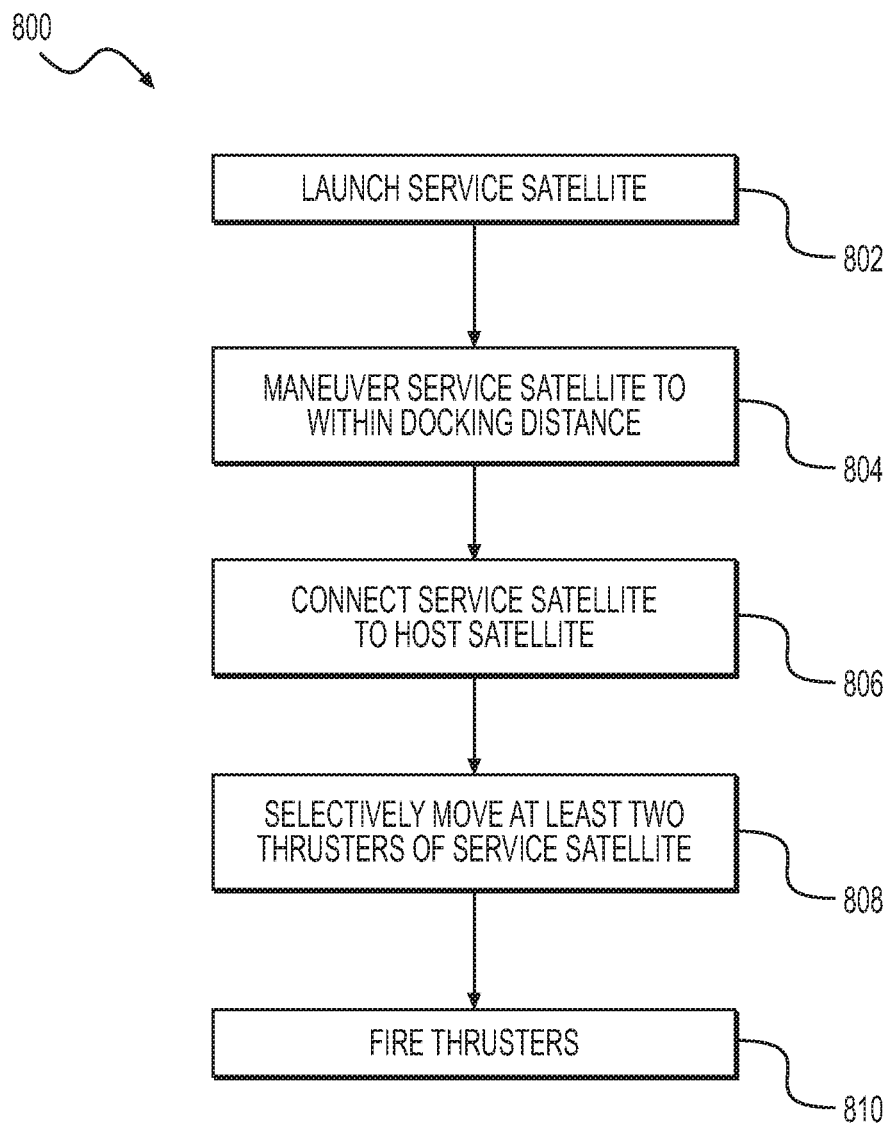
FIG. 8 illustrates steps of an exemplary method performed using the service satellite of FIGS. 1A and 1B, consistent with disclosed embodiments.

FIG. 8 illustrates an exemplary method 800 of providing station keeping services to a host satellite 200. The order and arrangement of steps in method 800 is provided for purposes of illustration. As will be appreciated from this disclosure, modifications may be made to method 800 by, for example, adding, combining, removing, and/or rearranging the steps of method 800. Certain steps of method 800 are described as being performed by controller 120 of service satellite 10. It is contemplated, however, that these steps may be additionally or alternatively performed by a controller located in a ground control station or on another spacecraft. It is also contemplated that in some exemplary embodiments, controller 120 of service satellite 10 may perform the disclosed steps based on instructions received by controller 120 from a controller located in a ground control station or on another spacecraft.

Method 800 may include a step of launching service satellite 10. (Step 802). Launching service satellite 10 may include loading service satellite 10 in a payload bay of a launch vehicle. The launch vehicle may include a missile, a rocket, a reusable spacecraft, a space shuttle, on any other conduit configured to convey the service satellite from earth to orbit. Thus, launching service satellite 10 may further include causing the launch vehicle to travel from a surface of the earth into space. Launching service satellite 10 may also include releasing service satellite 10 into a predetermined orbit in space. In some exemplary embodiments, service satellite 10 may be released in an orbit different from a geostationary orbit.

Method 800 may include a step of maneuvering service satellite 10 to within docking distance of a host satellite 200 (Step 804). Maneuvering service satellite 10 may include, for example, orienting at least two of thruster arms 90, 92, 94, 96 to an angular displacement $\theta_1$ (P1 position) relative a plane of a corresponding thruster deployment yoke 66, 68. FIG. 1B illustrates the P1 position of thrusters 36 and 40. Maneuvering service satellite 10 may further include, for example, firing two or more of thrusters 36, 38, 40, 42 oriented in the P1 position to move the service satellite to within a predetermined distance of a geostationary orbit. In some exemplary embodiments, the orbit of service satellite 10 may be raised to about 42,166 km.

Method 800 may include a step of connecting service satellite 10 to host satellite 200 (Step 806). There are many ways of forming such a connection, and the method, in its broadest sense is not limited to any particular structure. By way of example, connecting service satellite 10 may include deploying one or more docking arms 16 of service satellite 10. A controller 120 of service satellite 10 may adjust docking arms 16 such that ring engaging portions 34 of the one or more docking arms may be positioned to receive an interface ring 202 of host satellite 200. Controller 120 may adjust positions of docking arms 16 such that the ring engaging portions 34 may engage with interface ring 202 to engage with interface ring 202 at one or more locations. Engaging with interface ring 202 may allow service satellite 10 to dock with host satellite 200 to form an interconnected unit 206.

Method 800 may include a step of selectively moving at least two thrusters of the service satellite (Step 808). There are many ways of moving thrusters, and the method, in its broadest sense is not limited to any particular structure or controller logic. By way of example, controller 120 of service satellite 10 may move two or more of thruster arms 90, 92, 94, 96 to one of angular displacements $\theta_2$ (position P2), $\theta_3$ (position P3), $\theta_4$ (position P4), or $\theta_5$ (position P5). Controller 120 may select positions P2, P3, P4, or P5 so that when one or more of thrusters 36, 36, 40, 42 are fired, one or more of thrust vectors 122, 124, 132, 134, 160, 162, 166, or 168 do not pass through joint center of mass 126.

Method 800 may include a step of firing one or more thrusters 36, 38, 40, 42 (Step 810). For example, controller 120 may fire one or more thrusters 36, 38, 40, 42 for one or more time durations $T_1$, $T_2$, $T_3$, etc. to help ensure that host satellite 200 may remain in its allocated geostationary slot. Of course, there are many ways, patterns and timings of thruster firing, and the method, in its broadest sense is not limited to any one in particular.

In accordance with some exemplary embodiments of the present disclosure, the step of selectively moving the thrusters in the method of providing station keeping services to the host satellite may include the following steps. The method may include positioning a first thruster of the at least two thrusters at a first angular orientation and firing the first thruster during a first time period. The method may also include positioning a second thruster of the at least two thrusters at a second angular orientation different from the first angular orientation and firing the second thruster during the first time period. Further, the method may include moving the first thruster to assume the second angular orientation and firing the first thruster during a second time period following the first time period. In addition, the method may include moving the second thruster to assume the first angular orientation and firing the second thruster during the second time period.

Figure 9:
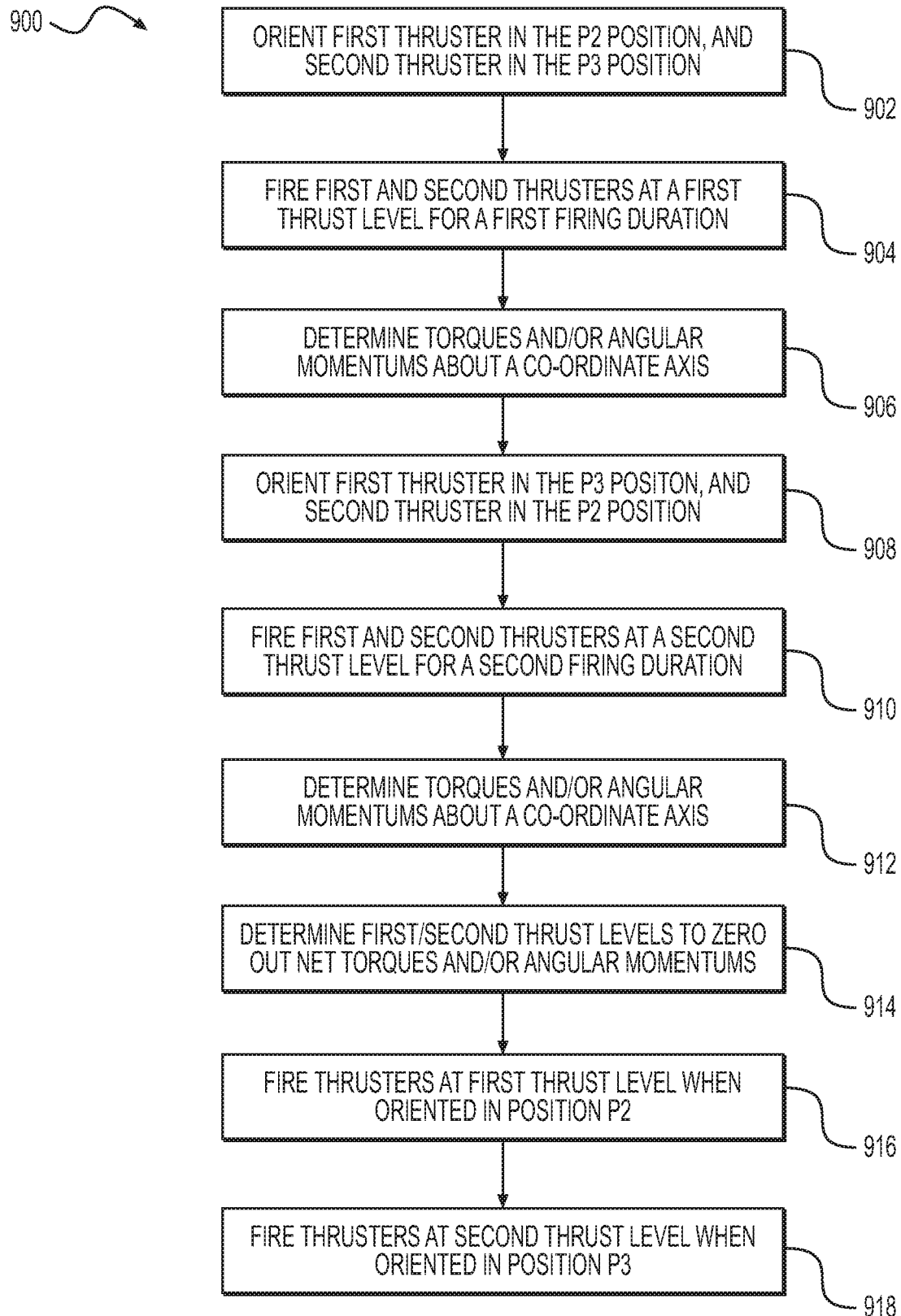
FIG. 9 illustrates steps of an exemplary method performed by the service satellite of FIGS. 1A and 1B, consistent with disclosed embodiments.

FIG. 9 illustrates an exemplary method 900 of providing station keeping services to a host satellite 200 by moving the thruster arms as described in the example above. The order and arrangement of steps in method 900 is provided for purposes of illustration. As will be appreciated from this disclosure, modifications may be made to method 900 by, for example, adding, combining, removing, and/or rearranging the steps of method 900. Certain steps of method 900 are described as being performed by controller 120 of service satellite 10 in the following disclosure. It is contemplated, however, that these steps may be additionally or alternatively performed by a controller located in a ground control station or on another spacecraft. It is also contemplated that in some exemplary embodiments, controller 120 of service satellite 10 may perform the disclosed steps based on instructions received by controller 120 from a controller located in a ground control station or on another spacecraft.

Method 900 includes a step of orienting a first thruster in the P2 position and a second thruster in the P3 position (Step 902). In one exemplary embodiment, controller 120 may orient thruster arm 90 at an angular displacement $\theta_2$ relative to thruster deployment yoke 66 so that thruster 36 is in the P2 position (see FIG. 4A). Controller 120 may also orient thruster arm 92 at an angular displacement $\theta_3$ relative to thruster deployment yoke 66 so that thruster 38 is in the P3 position (see FIG. 4A). It is to be understood that the method described with reference to FIG. 9 is not limited to any particular selection of thrusters and orientations. For example, in some embodiments, controller 120 may instead orient thruster arm 90 at an angular displacement $\theta_3$ and orient thruster arm 92 at an angular displacement $\theta_2$ (see FIG. 4B).

Method 900 may include a step of firing the first and second thrusters at a first thrust level for a first firing duration (Step 902). For example, when thruster 36 is in the P2 position and thruster 38 is in the P3 position (see FIG. 4A), controller 120 may fire thrusters 36 and 38 at a thrust level TH1 for a first firing duration $\Delta t_1$.

Method 900 may include a step of determining torques and/or angular momentums about one or more coordinate axes (Step 904). In one exemplary embodiment, controller 120 may determine one or more torques and/or angular momentums about one or more of the x, y, or z co-ordinate axes of interconnected unit 206. Controller 120 may determine the torques and/or angular momentums based on measurements of force, rotational speeds, which may be obtained from one or more sensors located on service satellite 10 or host satellite 200. In one exemplary embodiment, controller 120 may determine a torque F1 or angular momentum AM1 about an x axis (see e.g. FIG. 5C) of service satellite 10.

In one exemplary embodiment, controller 120 may perform steps 902-906 in a first time duration $T_1$. In other exemplary embodiments, within first time duration $T_1$, controller 120 may fire thrusters 36 and 38 simultaneously. It is also contemplated that in some embodiments, within first time duration $T_1$, controller 120 may fire thrusters 36 and 38 sequentially in any order.

Method 900 may include a step of orienting the first thruster in the P3 position and the second thruster in the P2 position (Step 908). In method step 908, controller 120 may switch the positions of the thrusters selected, for example, in step 902. For example, controller 120 may orient thruster arm 90, previously in position P2, to an angular displacement $\theta_3$ relative to thruster deployment yoke 66 so that thruster 36 is in the P3 position (see FIG. 4B). Likewise, controller 120 may orient thruster arm 92, previously in position P3, to an angular displacement $\theta_2$ relative to thruster deployment yoke 66 so that thruster 38 is in the P2 position (see FIG. 4B).

Method 900 may include a step of firing the first and second thrusters at a second thrust level for a second firing duration (Step 910). For example, when thruster 36 is in the P3 position and thruster 38 is in the P2 position, controller 120 may fire thrusters 36 and 38 at second thrust level TH2 for a second firing duration $\Delta t_2$.

Method 900 may include a step of determining torques and/or angular momentums about one or more co-ordinate axes (Step 912). Controller 120 may perform one or more steps similar to those discussed above with respect to, for example, step 906. In one exemplary embodiment, controller 120 may determine a torque F2 or angular momentum AM2 about the x axis (see e.g. FIG. 5B) of service satellite 10.

In one exemplary embodiment, controller 120 may perform steps 908-912 in a second time duration $T_2$. In other exemplary embodiments, within second time duration $T_2$, controller 120 may fire thrusters 36 and 38 simultaneously. It is also contemplated that in some embodiments, within second time duration $T_2$, controller 120 may fire thrusters 36 and 38 sequentially in any order. Time durations $T_1$ and $T_2$ may be equal or unequal.

Method 900 may include a step of determining the first and/or second thrust levels to zero out net torque and/or angular momentum (Step 914). In one exemplary embodiment, controller 120 may determine one or both of thrust levels TH1 and TH2 so that the net torque F1+F2 and/or the net angular momentum AM1+AM2 about, for example, the x axis is substantially zero.

Method 900 may include a step of firing thrusters at the first thrust level when oriented in position P2 (Step 916). In one exemplary embodiment, controller 120 may fire any of thrusters 36, 38 at a thrust level TH1 when thrusters 36 or 38 are oriented in the P2 position. Method 900 may also include a step of firing thrusters at the second thrust level when oriented in position P3 (Step 918). In one exemplary embodiment, controller 120 may fire any of thrusters 36, 38 at a thrust level TH2 when thrusters 36 or 38 are oriented in the P3 position.

While the above disclosure describes method steps 902-918 in terms of thrusters 36, 38, the disclosure in its broadest sense is not limited to that configuration or any particular structure or thruster firing sequence or angular orientation. For example, in some embodiments according to this disclosure, controller may select thruster arms 94, 96 instead of thruster arms 90, 92 for orienting the thruster arms in one of angular displacements $\theta_2$ or $\theta_3$. Controller 120 may perform steps 902-918 of method 900 using thrusters 40, 42. When controller 120 initially performs steps 902-918 using thrusters 40, 42, controller 120 may repeat steps 902-918 using the other pair of thrusters 36, 38 after about 12 hours. Controller 120 may also repeat steps 902-918 with both thruster pair 36, 38 and thruster pair 40, 42 after a predetermined period of time to help ensure that the host satellite remains in its allocated geostationary slot.

It is also contemplated that in some exemplary embodiments, controller 120 may initially perform steps 902-918 using thrusters 36, 40. Thus, for example, in step 902, controller 120 may orient thruster arm 90 at an angular displacement $\theta_2$ relative to thruster deployment yoke 66 so that thruster 36 is in the P2 position. Controller 120 may also orient thruster arm 94 at an angular displacement $\theta_3$ relative to thruster deployment yoke 68 so that thruster 42 is in the P3 position. Likewise, in step 908, controller 120 may orient thruster arm 90 at an angular displacement $\theta_3$ relative to thruster deployment yoke 66 so that thruster 36 is in the P3 position. Controller 120 may also orient thruster arm 94 at an angular displacement $\theta_2$ relative to thruster deployment yoke 68 so that thruster 42 is in the P2 position. After performing steps 902-918 using thrusters 36, 40, controller may repeat steps 902-918, using thruster arms 92, 96, and corresponding thrusters 38, 42 after about 12 hours. Controller 120 may also repeat steps 902-918 with both thruster pair 36, 40 and thruster pair 38, 42 after a predetermined period of time to help ensure that the host satellite remains in its allocated geostationary slot.

Figure 10:
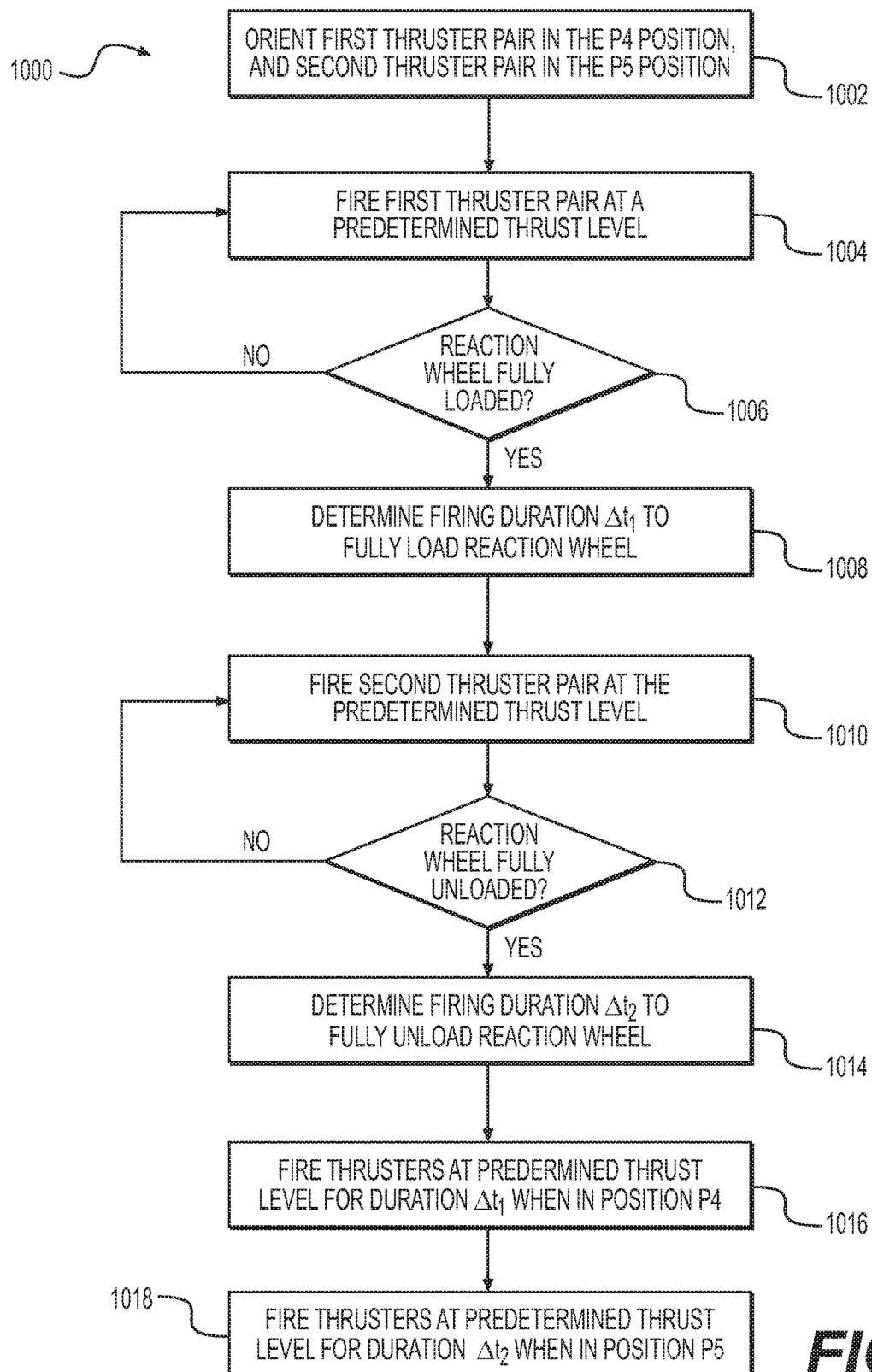
FIG. 10 illustrates steps of an exemplary method performed by the service satellite of FIGS. 1A and 1B, consistent with disclosed embodiments.

FIG. 10 illustrates another exemplary method 1000 of providing station keeping services to a host satellite 200. The order and arrangement of steps in method 1000 is provided for purposes of illustration. As will be appreciated from this disclosure, modifications may be made to method 1000 by, for example, adding, combining, removing, and/or rearranging the steps of method 1000. Certain steps of method 1000 are described as being performed by controller 120 of service satellite 10 in the following disclosure. It is contemplated, however, that these steps may be additionally or alternatively performed by a controller located in a ground control station or on another spacecraft. It is also contemplated that in some exemplary embodiments, controller 120 of service satellite 10 may perform the disclosed steps based on instructions received by controller 120 from a controller located in a ground control station or on another spacecraft.

Method 1000 includes a step of orienting a first thruster pair in the P4 position and a second thruster pair in the P5 position (Step 1002). In one exemplary embodiment, controller 120 may orient thruster arms 90, 92 at an angular displacement $\theta_4$ relative to thruster deployment yoke 66 so that thrusters 36 and 38 may be in the P4 position (see FIG. 6A). Controller 120 may also orient thruster arms 94, 96 at an angular displacement $\theta_5$ relative to thruster deployment yoke 68 so that thrusters 40 and 42 may be in the P5 position (see FIG. 6A). It is to be understood that the method described in connection with FIG. 10 is not limited to any particular selection of thrusters and orientations. For example, in some embodiments, controller 120 may instead orient thruster arms 90 and 92 at an angular displacement $\theta_5$ and orient thruster arms 94 and 96 at an angular displacement $\theta_4$.

Method 1000 may include a step of firing the first thruster pair at a predetermined thrust level (Step 1004). For example, when thrusters 36 and 38 are in the P4 position, controller 120 may fire thrusters 36 and 38 at a predetermined thrust level $TH_{PRE}$ (see FIG. 6A). Method 1000 may include a step of determining whether the reaction wheels are fully loaded (Step 1006). In some exemplary embodiments, controller 120 may determine whether reaction wheels associated with service satellite 10 are fully loaded (i.e. whether they have reached their predetermined maximum rotational speeds). When controller 120 determines that the reaction wheels associated with service satellite 10 are not fully loaded (Step 1006: No), method 1000 may return to step 1004 to continue firing thrusters 36 and 38 at the predetermined thrust level $TH_{PRE}$. When controller 120 determines, however, that the reaction wheels associated with service satellite 10 are fully loaded (Step 1006: Yes), method 1000 may proceed to step 1008.

Step 1008 of method 1000 may include determining firing duration $\Delta t_1$ to fully load the reaction wheels. In some exemplary embodiments, controller 120 may stop firing thrusters 36 and 38 and determine the duration $\Delta t_1$ required to fully load the reaction wheels associated with service satellite 10 as a result of firing thrusters 36 and 38 at the predetermine thrust level $TH_{PRE}$.

Method 1000 may include a step of firing the second thruster pair at the predetermined thrust level (Step 1010). For example, when thrusters 40 and 42 are in the P5 position, controller 120 may fire thrusters 40 and 42 at the predetermined thrust level $TH_{PRE}$ (see FIG. 6B). Method 1000 may include a step of determining whether the reaction wheels are fully unloaded (Step 1012). In some exemplary embodiments, controller 120 may determine whether reaction wheels associated with service satellite 10 are fully unloaded (i.e. reached their predetermined minimum rotational speeds). When controller 120 determines that the reaction wheels associated with service satellite 10 are not fully unloaded (Step 1012: No), method 1000 may return to step 1010 to continue firing thrusters 40 and 42 at the predetermined thrust level $TH_{PRE}$. When controller 120 determines, however, that the reaction wheels associated with service satellite 10 are fully unloaded (Step 1012: Yes), method 1000 may proceed to step 1014.

Step 1014 of method 1000 may include determining firing duration $\Delta t_2$ to fully unload reaction wheels. In some exemplary embodiments, controller 120 may stop firing thrusters 40 and 42 and determine the duration $\Delta t_2$ required to fully unload the reaction wheels associated with service satellite 10 as a result of firing thrusters 40 and 42 at the predetermine thrust level $TH_{PRE}$.

Method 1000 may include a step of firing thrusters at the predetermined thrust level $TH_{PRE}$ for the first duration of time $\Delta t_1$, when oriented in position P4 (Step 1016). In one exemplary embodiment, controller 120 may fire any of thrusters 36, 38, 40, 42 at a thrust level $TH_{PRE}$ for the first duration of time $\Delta t_1$ when any of thrusters 36, 38, 40, 42 are oriented in the P4 position.

Method 1000 may also include a step of firing thrusters at the predetermined thrust level $TH_{PRE}$ for the second duration of time $\Delta t_2$, when oriented in position P5 (Step 1018). In one exemplary embodiment, controller 120 may fire any of thrusters 36, 38, 40, 42 at a thrust level $TH_{PRE}$ for the second duration of time $\Delta t_2$ when any of thrusters 36, 38, 40, 42 are oriented in the P5 position.

Thus, for example, in some embodiments, controller 120 may orient first pair of thrusters 36 and 38 in the P4 position and fire thrusters 36 and 38 at the predetermined thrust level $TH_{PRE}$ for the first duration of time $\Delta t_1$. Controller 120 may also orient second pair of thrusters 40 and 42 in the P5 position and fire thrusters 40 and 42 at the predetermined thrust level $TH_{PRE}$ for the second duration of time $\Delta t_2$. After about 12 hours, controller 120 may orient the first pair of thrusters 36 and 38 in the P5 position and fire thrusters 36 and 38 at the predetermined thrust level $TH_{PRE}$ for the second duration of time $\Delta t_2$. Additionally, controller 120 may orient the second pair of thrusters 40 and 42 in the P4 position and fire thrusters 40 and 42 at the predetermined thrust level $TH_{PRE}$ for the first duration of time $\Delta t_1$. Controller 120 may repeat these steps after a predetermined period of time to help ensure that the host satellite remains in its allocated geostationary slot.

While the above disclosure describes method steps 1002-1018 in terms of first pair of thrusters 36, 38 and second pair of thrusters 40, 42, neither the method 1000 nor the disclosure in its broadest sense are not limited to that configuration. For example, in some embodiments according to this disclosure, controller may select thrusters 36 and 40 as the first pair of thrusters and thrusters 38 and 40 as the second pair of thrusters to perform method steps 1002-1018.

Some of the disclosed embodiments, depending on implementation, may provide several advantages over conventional station keeping methods. For example, in the embodiments of the present disclosure, it is not necessary to determine the exact location of a combined center of mass of the interconnected unit, including the service satellite and the host satellite. Instead, the thruster positions P2, P3, P4, and P5 corresponding to angular displacements $\theta_2$, $\theta_3$, $\theta_4$, $\theta_5$, respectively, may be predetermined and may be the same regardless of the size and/or mass of the host satellite. In particular, the thruster positions P2, P3, P4, and P5 may be selected such that the thrust vectors from any of the thrusters of the service satellite do not pass through any of the combined centers of mass of interconnected units, including the service satellite and a plurality of host satellites with which the service satellite may be able to dock in space. Instead the thrust vectors from thrusters oriented in any of the thruster positions P2, P3, P4, and P5 may be offset (i.e. spatially separated) from all of the combined centers of mass of the plurality of interconnected units.

The disclosed embodiments may also be based on the recognition that it may be difficult to accurately determine a combined center of mass of the interconnected unit. For example, as the fuel in the service satellite or the host satellite is expended, the combined center of mass may change. Additionally, errors in determining an accurate mass distribution of the service satellite and the host satellite may introduce errors in determining the combined center of mass. The disclosed service satellite may advantageously provide station keeping services without relying on the combined center of mass of the service satellite and the host satellite.

The disclosed service satellite may provide station keeping services via a variable thrust method (e.g. method 900 of FIG. 9) or a variable time method (e.g. method 1000 of FIG. 10). As discussed in detail in the above disclosure, in the variable thrust method, the service satellite may position a pair of thrusters on one side (north, south, east, or west) in positions P2 and P3, respectively. The selected thrusters may be fired a first thrust level TH1. The torques and/or angular momentums generated as a result of these thruster firings about at least one axis of the interconnected unit may be determined. The service satellite may then reposition the thrusters so that the thruster previously positioned at the P2 position is moved to the P3 position and vice-versa. The re-oriented thrusters may be fired at a second thrust level TH2, which may be selected so that the torques and/or angular momentums generated about the at least one axis may be substantially cancelled or zeroed out.

The service satellite may then position a pair of thrusters on one side (north, south, east, or west) in positions P2 and P3, respectively. The service satellite may fire the selected thrusters at thrust level TH1, switch the thruster positions and fire the thrusters at thrust level TH2, and repeat the process to provide the necessary translational movement to the interconnected unit while zeroing out any residual torques. The service satellite may repeat this procedure with thrusters on an opposite side every 12 hours. Thus, the service satellite may advantageously provide station keeping services to a host satellite without determining a combined center of mass of the service satellite and the host satellite, and without firing the thrusters through the combined center of mass.

As discussed in detail in the above disclosure, in the variable time method, the service satellite may position both thrusters of a first pair of thrusters on one side (north, south, east, or west) in, for example, a P4 positon. The service satellite may position a second pair of thrusters different from the first pair of thrusters in, for example, a P5 position. The second pair of thrusters may be located on an opposite site relative to the first pair of thrusters. Both thrusters of the first pair of thrusters may be fired at a predetermined thrust level $TH_{PRE}$ for a first time duration $T_1$ until one or more reaction wheels of the service satellite or the host satellite are fully loaded. After first time duration $T_1$ has elapsed, firing from the first pair of thrusters may cease. The service satellite may then fire the second pair of thrusters at the predetermined thrust level $TH_{PRE}$. The service satellite may determine the second time duration $T_2$ required to unload the one or more reaction wheels. It is to be noted that neither the thrust vectors from the first pair of thrusters nor the thrust vectors from the second pair of thrusters pass through a combined center of mass of the service satellite and the host satellite.

The service satellite may fire the first pair of thrusters at a thrust level $TH_{PRE}$ for the first time duration $T_1$, and the second pair of thrusters at a thrust level $TH_{PRE}$ for the second time duration $T_2$. After about 12 hours, the service satellite may switch the positions of the first and second pairs of thrusters. That is the first pair of thrusters previously oriented at the P4 position may be re-oriented so that the first pair of thrusters are in the P5 position. Likewise, the second pair of thrusters previously oriented at the P5 position may be re-oriented so that the second pair of thrusters are in the P4 position. The service satellite may then fire the first pair of thrusters at a thrust level $TH_{PRE}$ for the second time duration $T_2$, and the first pair of thrusters at a thrust level $TH_{PRE}$ for the first time duration $T_1$. The service satellite may repeat this procedure after a predetermined period of time. Thus, the service satellite may provide station keeping services to a host satellite without determining a combined center of mass of the service satellite and the host satellite, and without firing the thrusters through the combined center of mass.

Various alterations and modifications may be made to the disclosed exemplary embodiments without departing from the spirit or scope of the disclosure as embodied in the following claims. It is intended that the specification and examples be considered as exemplary only, with a true scope and spirit of the invention being indicated by the following claims.

What is claimed is:

1. A station keeping service satellite comprising:
a body;

a gripping mechanism attached to the body and adapted to attach to a host satellite to form an interconnected unit comprising the host satellite and the service satellite, the interconnected unit having a combined center of mass;

a first deployable extension arm comprising a first yoke arm rotatably connected to each of a first thruster arm and a second thruster arm, a proximal end of the first yoke arm rotatably connected to the body, a distal end of the first thruster arm fixedly attached to a first thruster and a distal end of the second thruster arm fixedly attached to a second thruster, the first thruster configured to produce a first thruster thrust vector directed along a first thruster thrust axis and directed toward a host satellite body, and the second thruster configured to produce a second thruster thrust vector directed along a second thruster thrust axis and directed toward the host satellite body;

a second deployable extension arm comprising a second yoke arm rotatably connected to each of a third thruster arm and a fourth thruster arm, a proximal end of the second yoke arm rotatably connected to the body, a distal end of the third thruster arm fixedly attached to a third thruster and a distal end of the fourth thruster arm fixedly attached to a fourth thruster, the third thruster configured to produce a third thruster thrust vector directed along a third thruster thrust axis and directed toward the host satellite body, and the fourth thruster configured to produce a fourth thruster thrust vector directed along a fourth thruster thrust axis and directed toward the host satellite body; and a controller configured to fire the first thruster at a predetermined first orientation and configured to fire the second thruster at a predetermined second orientation; wherein:

the first thruster thrust axis intersects the second thruster thrust axis at a thrust vector intersection point positioned within the host satellite body; and the interconnected unit is maintained at a substantially stationary orbit by thruster firing of the first thruster, the second thruster, the third thruster, and the fourth thruster.

2. The station keeping service satellite of claim 1, further comprising a sensor operating to sense an angular momentum or a rotational velocity of the interconnected unit.

3. The station keeping service satellite of claim 2, wherein a firing of at least one of the first thruster, the second thruster, the third thruster, and the fourth thruster substantially reduce an angular momentum or a rotational velocity of the interconnected unit to about zero.

4. A station keeping service satellite comprising:
a body;
a gripping mechanism attached to the body and adapted to attach to a host satellite to form an interconnected unit comprising the host satellite and the service satellite, the interconnected unit having a combined center of mass;

a first deployable extension arm comprising a first yoke arm rotatably connected to a first thruster arm, a proximal end of the first yoke arm rotatably connected to the body and a distal end of the first thruster arm fixedly attached to a first thruster, the first thruster configured to produce a first thruster thrust vector directed along a first thruster thrust axis and directed toward a host satellite body;

a second deployable extension arm comprising a second yoke arm rotatably connected to a second thruster arm, a proximal end of the second yoke arm rotatably connected to the body and a distal end of the second thruster arm fixedly attached to a second thruster, the second thruster configured to produce a second thruster thrust vector directed along a second thruster thrust axis and directed toward the host satellite body; and a controller configured to fire the first thruster at a predetermined first orientation and configured to fire the second thruster at a predetermined second orientation; wherein:

the first thruster thrust axis intersects the second thruster thrust axis at a thrust vector intersection point positioned within the host satellite body;

the interconnected unit is maintained at a substantially stationary orbit by thruster firing of the first thruster and the second thruster; and the first thruster and the second thruster are configured such that the first thruster thrust vector and the second thruster thrust vector do not pass through the combined center of mass and do intersect with a longitudinal plane of the interconnected unit on opposite sides of the combined center of mass.

5. The station keeping service satellite of claim 1, wherein the first thruster and the second thruster are configured such that the combined center of mass lies between intersection points of a longitudinal plane of the interconnected unit and the first thrust vector and the second thrust vector.

6. The station keeping service satellite of claim 1, wherein:
each of the first deployable extension arm and the second deployable extension arm are configured to operate in an undeployed configuration before the gripping mechanism attaches to the host satellite; and
each of the first deployable extension arm and the second deployable extension arm are configured to operate in a deployed configuration after the gripping mechanism attaches to the host satellite.

7. The station keeping service satellite of claim 1, wherein at least two of the first thruster, the second thruster, the third thruster, and the fourth thruster are configured to fire simultaneously.

8. The station keeping service satellite of claim 1, wherein:
the first thruster and the second thruster are spaced apart and positioned at different predetermined orientations; and
the third thruster and the fourth thruster are spaced apart and positioned at different predetermined orientations.

9. The station keeping service satellite of claim 1 wherein:
the first thruster and the second thruster are disposed on a first side of the service satellite; and
the third thruster and the fourth thruster are disposed on a second side of the service satellite opposite the first side.

10. A station keeping service satellite comprising:
a body;
a gripping mechanism attached to the body and adapted to attach to an interface ring extending from an external surface of a host satellite to form an interconnected unit comprising the host satellite and the service satellite, the interconnected unit having a combined center of mass;

a first deployable extension arm comprising a first yoke arm, a first thruster arm, and a second thruster arm, the first yoke arm rotatably attached to the service satellite at a first end and rotatably connected to each of the first thruster arm and the second thruster arm, a distal end of the first thruster arm fixedly attached to a first thruster and a distal end of the second thruster arm fixedly attached to a second thruster, the first thruster configured to produce a first thruster thrust vector directed along a first thruster thrust axis and directed toward a host satellite body, and the second thruster configured to produce a second thruster thrust vector directed along a second thruster thrust axis and directed toward the host satellite body;
a second deployable extension arm comprising a second yoke arm, a third thruster arm, and a fourth thruster arm, the second yoke arm rotatably attached to the service satellite at a first end and rotatably connected to each of the third thruster arm and the fourth thruster arm, a distal end of the third thruster arm fixedly attached to a third thruster and a distal end of the fourth thruster arm fixedly attached to a fourth thruster, the third thruster configured to produce a third thruster thrust vector directed along a third thruster thrust axis and the fourth thruster configured to produce a fourth thruster thrust vector directed along a fourth thruster thrust axis;
a controller configured to fire the first thruster at a predetermined first orientation of a set of predetermined first orientations and configured to fire the second thruster at a predetermined second orientation of a set of predetermined second orientations; wherein:
the first thruster thrust axis intersects the second thruster thrust axis at a thrust vector intersection point positioned within the host satellite body;
the first thruster is a first north thruster and the second thruster is a second north thruster, each disposed on a first side of the service satellite; and
the third thruster is a first south thruster and the fourth thruster is a second south thruster, each disposed on a second side of the service satellite opposite the first side; and
the interconnected unit is maintained at a substantially stationary orbit by operation of at least one of the first thruster, the second thruster, the third thruster, and the fourth thruster.

11. A station keeping service satellite comprising:
a body;
a gripping mechanism attached to the body and adapted to attach to an interface ring extending from an external surface of a host satellite to form an interconnected unit comprising the host satellite and the service satellite, the interconnected unit having a combined center of mass;
a first deployable extension arm comprising a first yoke arm and a first thruster arm, the first yoke arm rotatably attached to the service satellite at a first end and rotatably connected at a second end to a first end of the first thruster arm, a second end of the first thruster arm fixedly attached to a first thruster, the first thruster configured to produce a first thruster thrust vector directed along a first thruster thrust axis and directed toward a host satellite body;
a second deployable extension arm comprising a second yoke arm and a second thruster arm, the second yoke arm rotatably attached to the service satellite at a first end and rotatably connected at a second end to a first end of the second thruster arm, a second end of the second thruster arm fixedly attached to a second thruster, the second thruster configured to produce a second thruster thrust vector directed along a second thruster thrust axis and directed toward the host satellite body;
a controller configured to fire the first thruster at a predetermined first orientation of a set of predetermined first orientations and configured to fire the second thruster at a predetermined second orientation of a set of predetermined second orientations; wherein:
the first thruster thrust axis intersects the second thruster thrust axis at a thrust vector intersection point;
the first thruster is a pair of first thrusters comprising a first north thruster and a second north thruster, the pair of first thrusters disposed on a first side of the service satellite; and
the second thruster is a pair of second thrusters comprising a first south thruster and a second south thruster, the pair of second thrusters disposed on a second side of the service satellite opposite the first side; and
the interconnected unit is maintained at a substantially stationary orbit by operation of the first thruster and the second thruster;
the first thruster and the second thruster are configured such that the first thruster thrust vector and the second thruster thrust vector do not pass through the combined center of mass and do not intersect with a longitudinal plane of the interconnected unit on opposite sides of the combined center of mass.

12. The station keeping service satellite of claim 10, wherein the first thruster and the second thruster are configured such that the combined center of mass lies between intersection points of a longitudinal plane of the interconnected unit and the thrust vectors from each of the first thruster and the second thruster.

13. The station keeping service satellite of claim 10, wherein:
each of the first deployable extension arm and the second deployable extension arm are configured to operate in an undeployed configuration before the gripping mechanism attaches to the interface ring; and
each of the first deployable extension arm and the second deployable extension arm are configured to operate in a deployed configuration after the gripping mechanism attaches to the interface ring.

14. The station keeping service satellite of claim 10, wherein at least two of the first thruster, the second thruster, the third thruster, and the fourth thruster are configured to fire simultaneously.

15. The station keeping service satellite of claim 10, wherein:
the first thruster and the second thruster are spaced apart and positioned at different predetermined orientations; and
the third thruster and the fourth thruster are spaced apart and positioned at different predetermined orientations.

16. A station keeping service satellite comprising:
a body;
a gripping mechanism attached to the body and adapted to attach to an external surface of a host satellite to form an interconnected unit comprising the host satellite and the service satellite, the interconnected unit having a combined center of mass;
a first deployable extension arm comprising a first yoke arm, a first thruster arm, and a second thruster arm, the first yoke arm attached to the service satellite at a first end and rotatably connected to a first end of the first thruster arm and rotatably connected to a first end of the second thruster arm, a second end of the first thruster arm attached to a first thruster and a second end of the second thruster arm attached to a second thruster, the first thruster configured to produce a first thruster thrust vector directed along a first thruster thrust axis and directed toward a host satellite body, the second thruster configured to produce a second thruster thrust vector directed along a second thruster thrust axis and directed toward the host satellite body;

a second deployable extension arm comprising a second yoke arm, a third thruster arm, and a fourth thruster arm, the second yoke arm attached to the service satellite at a first end and rotatably connected to a first end of the third thruster arm and rotatably connected to a first end of the fourth thruster arm, a second end of the third thruster arm attached to a third thruster, the third thruster configured to produce a third thruster thrust vector directed along a third thruster thrust axis and directed toward the host satellite body, a second end of the fourth thruster arm attached to a fourth thruster, the fourth thruster configured to produce a fourth thruster thrust vector directed along a fourth thruster thrust axis;

a controller configured to fire the first thruster and the second thruster such that the first thruster thrust axis intersects the second thruster thrust axis at a thrust vector intersection point, the thrust vector intersection point positioned within the host satellite body; wherein:

the interconnected unit is maintained at a substantially stationary orbit by operation of at least one of the first thruster, the second thruster, the third thruster, and the fourth thruster.

17. The station keeping service satellite of claim 16, wherein the controller further operates to fire the first thruster at a predetermined first orientation of a set of predetermined first orientations, and to fire the second thruster at a predetermined second orientation of a set of predetermined second orientations.

18. The station keeping service satellite of claim 16, wherein:
- each of the first deployable extension arm and the second deployable extension arm are configured to operate in an undeployed configuration before the gripping mechanism attaches to the host satellite; and
- each of the first deployable extension arm and the second deployable extension arm are configured to operate in a deployed configuration after the gripping mechanism attaches to the host satellite.

19. The station keeping service satellite of claim 16, wherein:
- the first yoke arm is rotatably attached to the service satellite at the first end of the first yoke arm;
- the second end of the first thruster arm is fixedly attached to the first thruster and the second end of the second thruster arm is fixedly attached to the second thruster;
- the second yoke arm is rotatably attached to the service satellite at the first end of the second yoke arm;
- the second end of the third thruster arm is fixedly attached to the third thruster and the second end of the fourth thruster is fixedly attached to the fourth thruster.

20. The station keeping service satellite of claim 16, wherein:
- the first thruster and the second thruster are each disposed on a first side of the service satellite; and
- the third thruster and the fourth thruster are each disposed on a second side of the service satellite opposite the first side.

* * * * *